(12) United States Patent
Morita

(10) Patent No.: US 9,813,134 B1
(45) Date of Patent: Nov. 7, 2017

(54) BASE STATION AND ANTENNA CALIBRATION METHOD

(71) Applicant: FUJITSU LIMITED, Kawasaki-shi, Kanagawa (JP)

(72) Inventor: Junya Morita, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/615,162

(22) Filed: Jun. 6, 2017

(30) Foreign Application Priority Data

Jul. 29, 2016 (JP) .................................. 2016-150698

(51) Int. Cl.
| | | |
|---|---|---|
| *H03M 3/00* | (2006.01) | |
| *H04B 7/06* | (2006.01) | |
| *H04L 25/02* | (2006.01) | |
| *H04W 16/28* | (2009.01) | |
| *H04W 36/00* | (2009.01) | |
| *H04W 36/30* | (2009.01) | |

(52) U.S. Cl.
CPC ......... *H04B 7/0626* (2013.01); *H04B 7/0628* (2013.01); *H04B 7/0632* (2013.01); *H04L 25/0204* (2013.01); *H04W 16/28* (2013.01); *H04W 36/0005* (2013.01); *H04W 36/30* (2013.01)

(58) Field of Classification Search
CPC ........ H01Q 3/26; H01Q 3/267; H04B 7/0626; H04B 7/0628; H04B 7/0632; H04W 36/30; H04W 36/005; H04W 16/28; H04L 25/0204
USPC .................. 341/143; 342/368, 372
See application file for complete search history.

(56) References Cited

U.S. PATENT DOCUMENTS

| | | | | |
|---|---|---|---|---|
| 6,898,235 | B1 * | 5/2005 | Carlin .................... | H04B 1/001 342/147 |
| 7,145,508 | B2 * | 12/2006 | Kawasaki ............... | H01Q 3/267 342/368 |
| 2006/0135211 | A1 | 6/2006 | Chae et al. | |
| 2006/0234694 | A1 * | 10/2006 | Kawasaki ............... | H01Q 3/267 455/423 |
| 2006/0279459 | A1 * | 12/2006 | Akiyama ................ | H01Q 3/267 342/372 |

(Continued)

FOREIGN PATENT DOCUMENTS

| | | |
|---|---|---|
| JP | 2005-348235 | 12/2005 |
| JP | 2006-166452 | 6/2006 |
| JP | 2013-034129 | 2/2013 |

*Primary Examiner* — Lam T Mai
(74) *Attorney, Agent, or Firm* — Fujitsu Patent Center

(57) ABSTRACT

A first FFT operator converts, with respect to each of analog circuits, a feedback signal x(t) in the time domain that is obtained after a transmission signal d(t) passes through the analog circuit into a feedback signal X(f) in the frequency domain. A second FFT operator converts the transmission signal in the time domain into a transmission signal D(f) in the frequency domain. A phase error calculator calculates, with respect to each of the analog circuits, a phase error C(f) in the frequency domain based on the feedback signal X(f) and the transmission signal D(f). An IFFT operator calculates, with respect to each of the analog circuits, a tap coefficient c(t) of an FIR filter based on the phase error C(f). The FIR filter 21 filters, with respect to each of the analog circuits, the transmission signal d(t) based on the tap coefficient c(t).

8 Claims, 15 Drawing Sheets

(56) References Cited

U.S. PATENT DOCUMENTS

2006/0293087 A1* 12/2006 Tsutsui ................... H04B 7/086
    455/562.1
2014/0192923 A1    7/2014 Matsuo et al.
2017/0012762 A1* 1/2017 Chang ....................... H04L 5/14

* cited by examiner

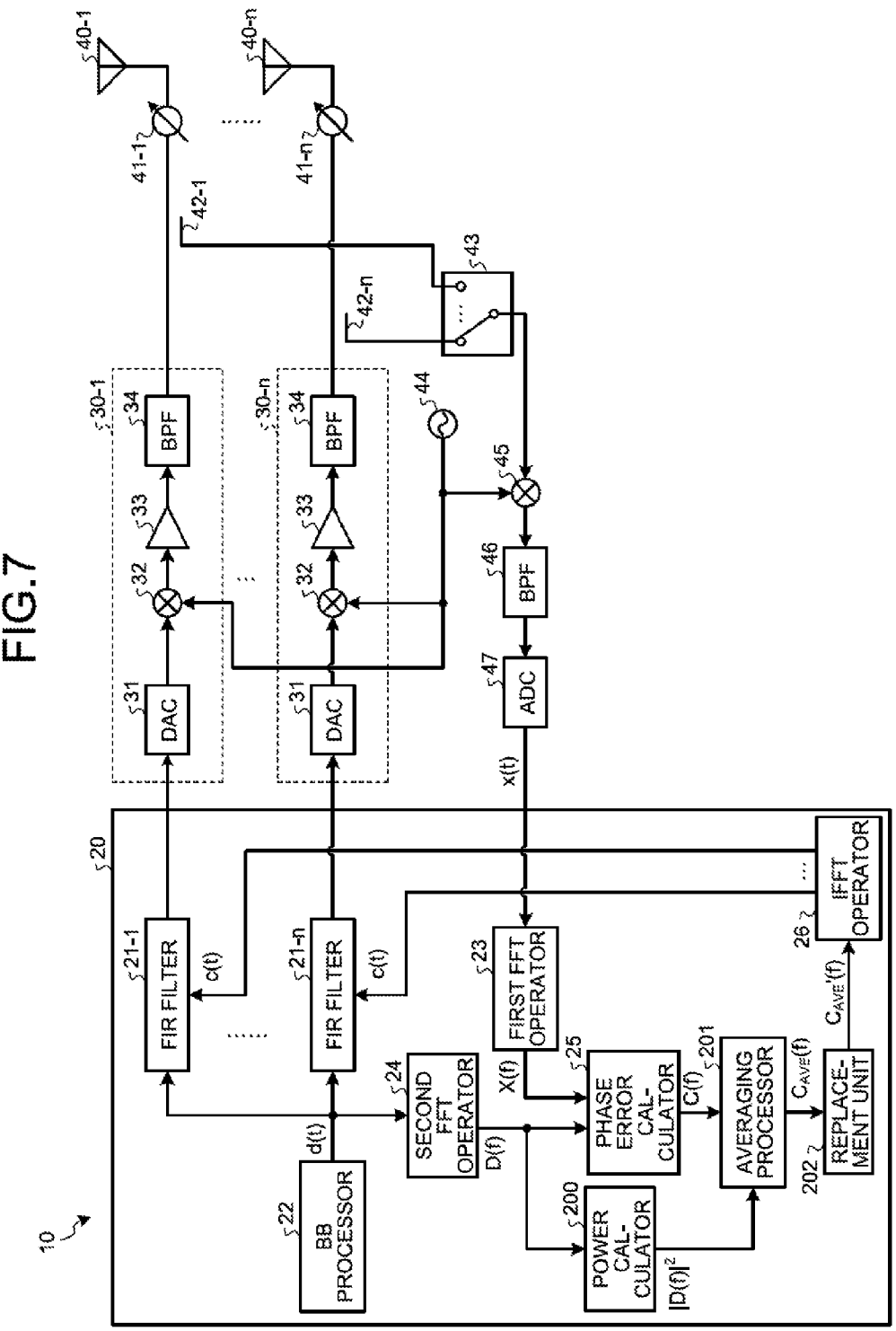

BASE STATION AND ANTENNA CALIBRATION METHOD

CROSS-REFERENCE TO RELATED APPLICATION(S)

This application is based upon and claims the benefit of priority of the prior Japanese Patent Application No. 2016-150698, filed on Jul. 29, 2016, the entire contents of which are incorporated herein by reference.

FIELD

The embodiments discussed herein are related to a base station and an antenna calibration method.

BACKGROUND

For base stations in a wireless communication system, there has been increasing development of beam forming technologies that control directionality of multiple antennas to enable sharp emission of a radio wave in a specific direction. Using beam forming technologies reduces wave interference between terminals and thus enables wireless communications with more distant terminals. The beam forming technologies adjust phase errors between multiple antennas, thereby forming beams highly accurately. In order to form a beam highly accurately, antenna calibration for correcting phase errors between multiple antennas is performed.

For example, a technology that enables an OFDM wireless device to use a transmission signal as a reference signal, perform FFT processing on the reference signal to convert the reference signal into a signal in the frequency domain, and perform antenna calibration in the frequency domain is known. Related-art example is described in Japanese Laid-open Patent Publication No. 2005-348235.

The above-described technology, however, performs calibration by uniformly controlling the phases of signals over the whole frequency domain and therefore, when frequencies have different phase errors, respectively, it is difficult to correct the phase errors among antennas accurately. For example, when a signal occurs intermittently in each frequency, a phase error is calculated with respect to a frequency in which the signal does not exist can be calculated. This lowers the accuracy of calculating phase errors and thus it is difficult to accurately correct phase errors among antennas.

SUMMARY

According to an aspect of an embodiment, a base station including a plurality of antennas and a plurality of analog circuits that are provided for the antennas, respectively, the base station includes a first converter, a second converter, a first calculator, a second calculator, and a finite impulse response (FIR) filter. The first converter converts, with respect to each of the analog circuits, a signal in a time domain that is obtained after a given signal passes through the analog circuit into a first signal in a frequency domain. The second converter converts the signal in the time domain into a second signal in the frequency domain. The first calculator calculates, with respect to each of the analog circuits, an inverse characteristic of a phase characteristic in the frequency domain based on the first signal and the second signal. The second calculator calculates, with respect to each of the analog circuits, a tap coefficient of a filter based on the inverse characteristic of the phase characteristic. The FIR filter filters, with respect to each of the analog circuits, the given signal that is input to the analog circuit based on the tap coefficient that is calculated by the second calculator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a block diagram of an exemplary base station according to a third embodiment;

DESCRIPTION OF EMBODIMENT(S)

Preferred embodiments of the present invention will be explained with reference to accompanying drawings. The following embodiments do not limit the disclosed technology.

[a] First Embodiment

Configuration of Base Station

Figure 1:
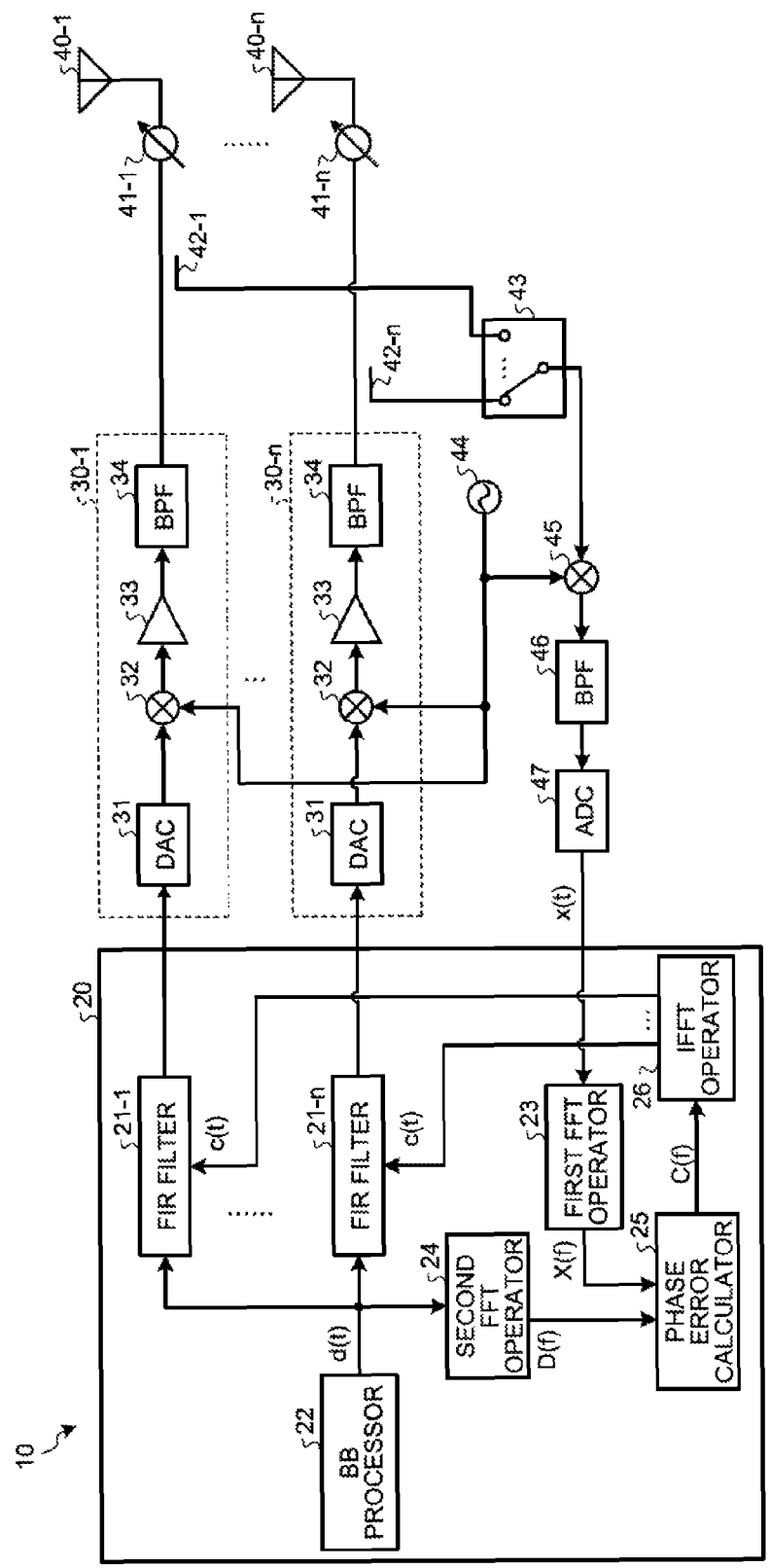
FIG. 1 is a block diagram of an exemplary base station according to a first embodiment.

FIG. 1 is a block diagram of an exemplary base station 10 according to a first embodiment. The base station 10 includes a digital processor 20, a plurality of analog circuits 30-1 to 30-$n$, a plurality of antennas 40-1 to 40-$n$, a plurality of phase shifters 41-1 to 41-$n$, and a plurality of couplers 42-1 to 42-$n$. The base station 10 further includes a selector 43, an oscillator 44, a downconverter 45, a band pass filter (BPF) 46, and an analog to digital converter (ADC) 47. The antennas 40-1 to 40-$n$ constitute an array antenna. The phase shifters 41-1 to 41-$n$ adjust the phase errors of transmission signals, thereby forming beams having directionality in given directions.

When the analog circuits 30-1 to 30-$n$ are collectively referred to without being distinguished from one another, they will be simply referred to as the analog circuits 30. When the antennas 40-1 to 40-$n$ are collectively referred to without being distinguished from one another, they will be simply referred to as the antennas 40. When the phase shifters 41-1 to 41-$n$ are collectively referred to without being distinguished from one another, they will be simply referred to as the phase shifters 41. When the couplers 42-1 to 42-$n$ are collectively referred to without being distinguished from one another, they will be simply referred to as the couplers 42.

In the base station 10, one of the analog circuits 30, one of the phase shifters 41, and one of the couplers 42 are provided in association with one of the antennas 40. Each of the analog circuits 30 performs given processing on a transmission signal that is output from the digital processor 20 and outputs the transmission signal to the corresponding phase shifter 41. Each of the phase shifters 41 adjusts the phase of the signal that is output from the corresponding analog circuit 30 and then outputs the signal to the corresponding antenna 40. Each of the antennas 40 emits the signal whose phase is adjusted by the corresponding phase shifter 41 as a radio wave. Each of the couplers 42 sends back part of the transmission signal that is output from the corresponding analog circuit 30 as a feedback signal to the selector 43.

Each of the analog circuits 30 includes a digital to analog converter (DAC) 31, an upconverter 32, a power amplifier (PA) 33, and a BPF 34. The DAC 31 converts the transmission signal that is output from the digital processor 20 from a digital signal into an analog signal. The upconverter 32 performs processing, such as orthogonal modulation and upconversion, on the transmission signal, which is converted into the analog signal by the DAC 31, by using a local oscillation signal that is output from the oscillator 44. The PA 33 amplifies the transmission signal on which the upconverter 32 performs, for example, orthogonal modulation. The BPF 34 limits the frequency band of the transmission signal that is amplified by the PA 33 to a given frequency band. The BPF 34 outputs the transmission signal whose frequency band is limited to the corresponding phase shifter 41.

The selector 43 sequentially selects the signals that are sent back as feedback signals from the respective couplers 42 and outputs the signals to the downconverter 45. The downconverter 45 performs processing, such as downconversion and coherent detection, on the signal, which is sent back as a feedback signal via the selector 43, by using a signal that is output from the oscillator 44. The BPF 46 limits the frequency band of the feedback signal on which the downconverter 45 performs, for example, the coherent detection to a given frequency band. The ADC 47 converts the feedback signal whose frequency band is limited by the BPF 46 from an analog signal into a digital signal. The ADC 47 outputs the feedback signal that is converted into the digital signal to the digital processor 20. The feedback signal that is output from the ADC 47 is defined as $x(t)$. The feedback signal $x(t)$ is a signal in the time domain after transmission of the transmission signal through the analog circuit 30.

The digital processor 20 includes a plurality of FIR filters 21-1 to 21-$n$, a base band (BB) processor 22, a first fast Fourier transform (FFT) operator 23, a second FFT operator 24, a phase error calculator 25, and an inverse FFT (IFFT) operator 26. When the FIR filters 21-1 to 21-$n$ are collectively referred to without being distinguished from one another, they will be simply referred to as the FIR filters 21.

The BB processor 22 generates a baseband transmission signal $d(t)$ and outputs the generated transmission signal $d(t)$ to each of the FIR filters 21 and the second FFT operator 24. The FIR filters 21 are provided for the analog circuits 30, respectively. Each of the FIR filters 21 filters the transmission signal $d(t)$, which is output from the BB processor 22, on the basis of a tap coefficient $c(t)$ of each tap that is output from the IFFT operator 26 and outputs the filtered transmission signal $d(t)$ to the corresponding analog circuit 30. The transmission signal $d(t)$ is an exemplary given signal.

The first FFT operator 23 performs FFT on the feedback signal $x(t)$ in the time domain that is output from the ADC 47 to convert the feedback signal $x(t)$ in the time domain into a feedback signal $X(f)$ in the frequency domain. The feedback signal $x(t)$ that is sent back as a feedback from the coupler 42 that is selected by the selector 43 is input to the first FFT operator 23. The first FFT operator 23 performs FFT on N samples at N points of the feedback signal $x(t)$ in the time domain. The value of N is, for example, 256. The first FFT operator 23 is an exemplary first converter. The feedback signal $X(f)$ in the frequency domain is an exemplary first signal.

The second FFT operator 24 performs FFT on the transmission signal $d(t)$ in the time domain that is output from the BB processor 22 to convert the transmission signal $d(t)$ in the time domain into a transmission signal $D(f)$ in the frequency domain. The second FFT operator 24 perform FFT at N points on N samples of the transmission signal $d(t)$ of the time domain. The second FFT operator 24 is an exemplary second converter. The transmission signal $D(f)$ in the frequency domain is an exemplary second signal. As FFT is performed on the transmission signal $d(t)$ and the feedback signal $X(t)$ in the time domain at N points, the frequency interval $\Delta f$ between adjacent FFT points in the frequency domain is represented by $f_s/N$ using a sampling frequency $f_s$. Accordingly, an FFT point exists in the frequency domain at every given frequency interval $\Delta f$. Each of the FFT points corresponds to a given frequency.

The phase error calculator 25 calculates a phase error $C(f)$ for each FFT point on the basis of the transmission signal $D(f)$ in the frequency domain and the feedback signal $X(f)$. The phase error calculator 25 outputs the calculated phase errors $C(f)$ to the IFFT operator 26. In the first embodiment, the phase error calculator 25 calculates the phase error $C(f)$ for each FFT point by multiplying the transmission signal $D(f)$ by the reciprocal of the feedback signal $X(f)$ for each FFT point. As the reciprocal of the feedback signal $X(f)$ represents the inverse characteristic of the phase characteristic of the analog circuit 30 in the frequency domain, the phase error $C(f)$ represents the inverse characteristic of the phase characteristic of the analog circuit 30 in the frequency domain based on the transmission signal $D(f)$. The phase error calculator 25 is an exemplary first calculator.

The IFFT operator 26 performs IFFT on the phase error $C(f)$ for each FFT point that is output from the phase error calculator 25 to calculate a tap coefficient $c(t)$ of each tap of the FIR filter 21. The IFFT operator 26 then outputs the calculated tap coefficients c(t) to the FIR filter 21 that filters the transmission signal that is input to the analog circuit 30 corresponding to the coupler 42 that is selected by the selector 43. The IFFT operator 26 is an exemplary second calculator.

Procedure of Antenna Calibration

Figure 2:
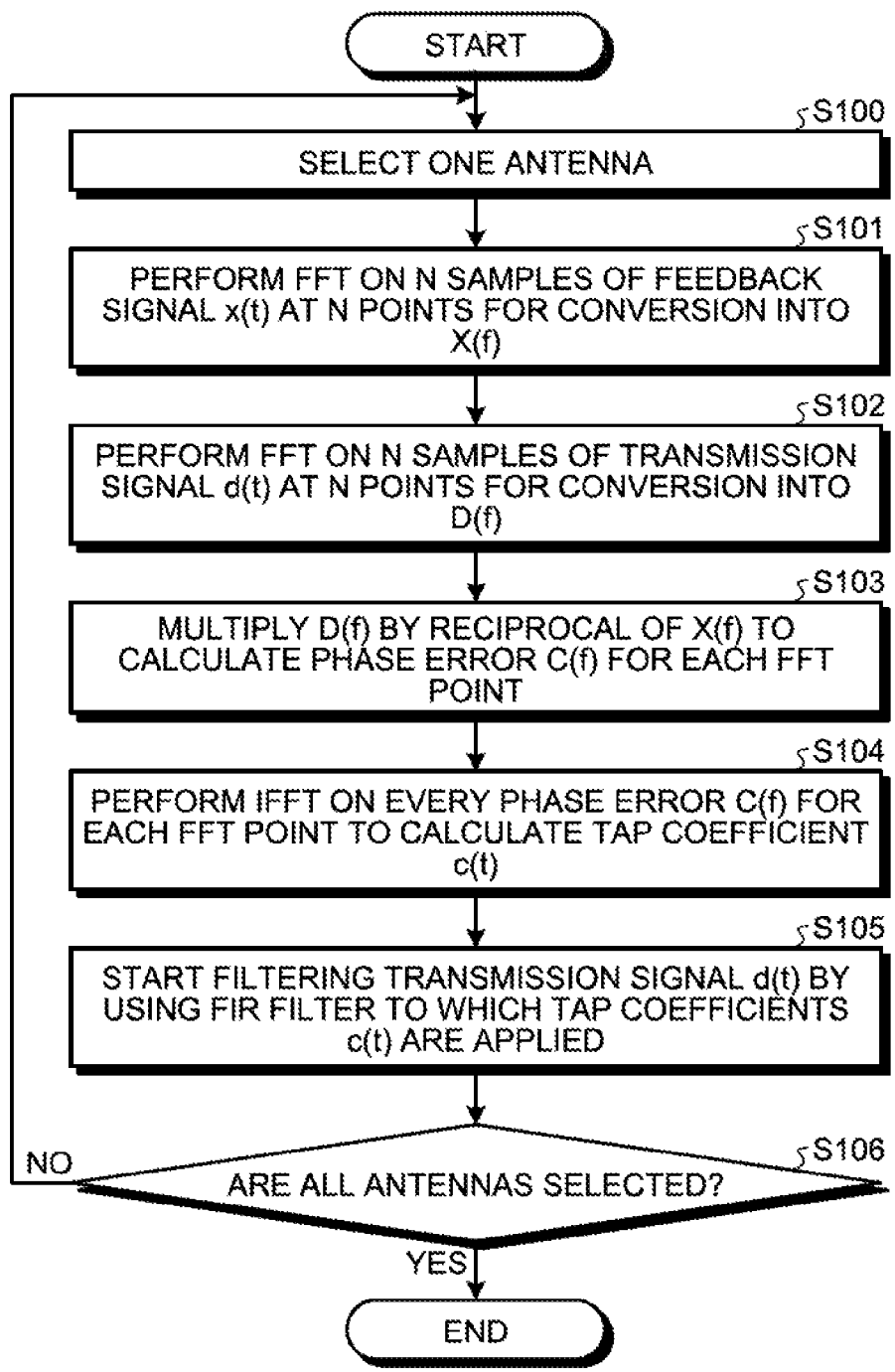
FIG. 2 is a flowchart of exemplary antenna calibration according to the first embodiment.

FIG. 2 is a flowchart of exemplary antenna calibration according to the first embodiment. The base station 10 executes the process illustrated in FIG. 2 per given timing during operation.

First of all, the selector 43 selects one of the antennas 40 (S100). The selector 43 then outputs a signal that is output from the coupler 42 corresponding to the selected antenna 40 to the downconverter 45. The signal that is output from the selector 43 is input as a feedback signal x(t) to the first FFT operator 23 via the downconverter 45, the BPF 46 and the ADC 47.

The first FFT operator 23 then performs FFT on N samples of the feedback signal x(t) at N points to convert the feedback signal x(t) in the time domain into a feedback signal X(f) in the frequency domain (S101).

The second FFT operator 24 then performs FFT on N samples of a baseband transmission signal d(t) at N points to convert the transmission signal d(t) in the time domain into a transmission signal D(f) in the frequency domain (S102).

The phase error calculator 25 then calculates a phase error C(f) for each FFT point by multiplying the transmission signal D(f) in the frequency domain by the reciprocal of the feedback signal X(f) in the frequency domain for each FFT point (S103).

The IFFT operator 26 then performs IFFT on the phase error C(f) for each FFT point that is calculated by the phase error calculator 25 to calculate a tap coefficient c(t) of each tap of the FIR filter 21 (S104). The IFFT operator 26 then outputs the calculated tap coefficients c(t) to the FIR filter 21 that filters the transmission signal that is input to the analog circuit 30 corresponding to the coupler 42 that is selected by the selector 43.

The FIR filter 21 then starts filtering processing of filtering the transmission signal d(t) that is output from the BB processor 22 on the basis of the tap coefficients c(t) that are output from the IFFT operator 26 and outputting the transmission signal d(t) to the corresponding analog circuit 30 (S105).

The selector 43 then determines whether all the antennas 40 are selected (S106). When there is the antenna 40 unselected (NO at S106), the selector 43 executes the process at step S100 again. On the other hand, when all the antennas 40 are selected (YES at S106), the base station 10 ends the antenna calibration illustrated in the flowchart.

Effect of First Embodiment

As it is clear from the above descriptions, the base station 10 according to the first embodiment includes the antennas 40, the analog circuits 30, the first FFT operator 23, the second FFT operator 24, the phase error calculator 25, the IFFT operator 26, and the FIR filters 21. The first FFT operator 23 converts, with respect to each of the analog circuits 30, the feedback signal x(t) in the time domain generated after the transmission signal d(t) passes through the analog circuit 30 into the feedback signal X(f) in the frequency domain. The second FFT operator 24 converts the transmission signal d(t) in the time domain into the transmission signal D(f) in the frequency domain. The phase error calculator 25 calculates, with respect to each of the analog circuits 30, the phase error C(f) indicating the inverse characteristic of the phase characteristic in the frequency domain on the basis of the feedback signal X(f) and the transmission signal D(f). The IFFT operator 26 calculates, with respect to each of the analog circuits 30, the tap coefficients c(t) of the FIR filter 21 on the basis of the phase errors C(f). The FIR filter 21 filters, with respect to each of the analog circuits 30, the transmission signal d(t) that is input to the analog circuit 30 on the basis of the tap coefficients c(t) that are calculated by the IFFT operator 26.

As described above, the base station 10 according to the first embodiment calculates the phase errors C(f) indicating the inverse characteristic of the phase characteristic of the analog circuit 30 in the frequency domain. Thus, the base station 10 of the first embodiment is able to correct the phase error of each frequency even when the frequencies have different phase errors, respectively. Accordingly, the base station 10 is able to correct the phase errors in each of the analog circuits 30 with respect to the reference transmission signal d(t) and thus reduce the phase errors among the analog circuits 30 that are connected to the respective antennas 40 on the basis of the phases of the transmission signal d(t). Thus, the base station 10 of the first embodiment is able to improve accuracy of antenna calibration.

[b] Second Embodiment

When no communication traffic occurs, a period in which no signal is transmitted from the base station occurs. When no signal is transmitted from the base station 10 at the timing when antenna calibration is performed, it is difficult to calculate phase errors of each of the analog circuits 30 accurately. Furthermore, a system in which a signal is transmitted intermittently in each frequency, such as orthogonal frequency-division multiplexing (OFDM), has difficulty in accurately calculating phase errors with respect to frequencies in which the signal is not transmitted. To deal with this, in the second embodiment, it is determined whether there is the transmission signal for each of given frequencies and the phase error that is calculated for the last time is continuously used with respect to the frequency in which the transmission signal does not exist. Accordingly, it is possible to hold down deterioration of accuracy in calculating a phase error with respect to a frequency in which the signal is not transmitted.

Configuration of Base Station 10

Figure 3:
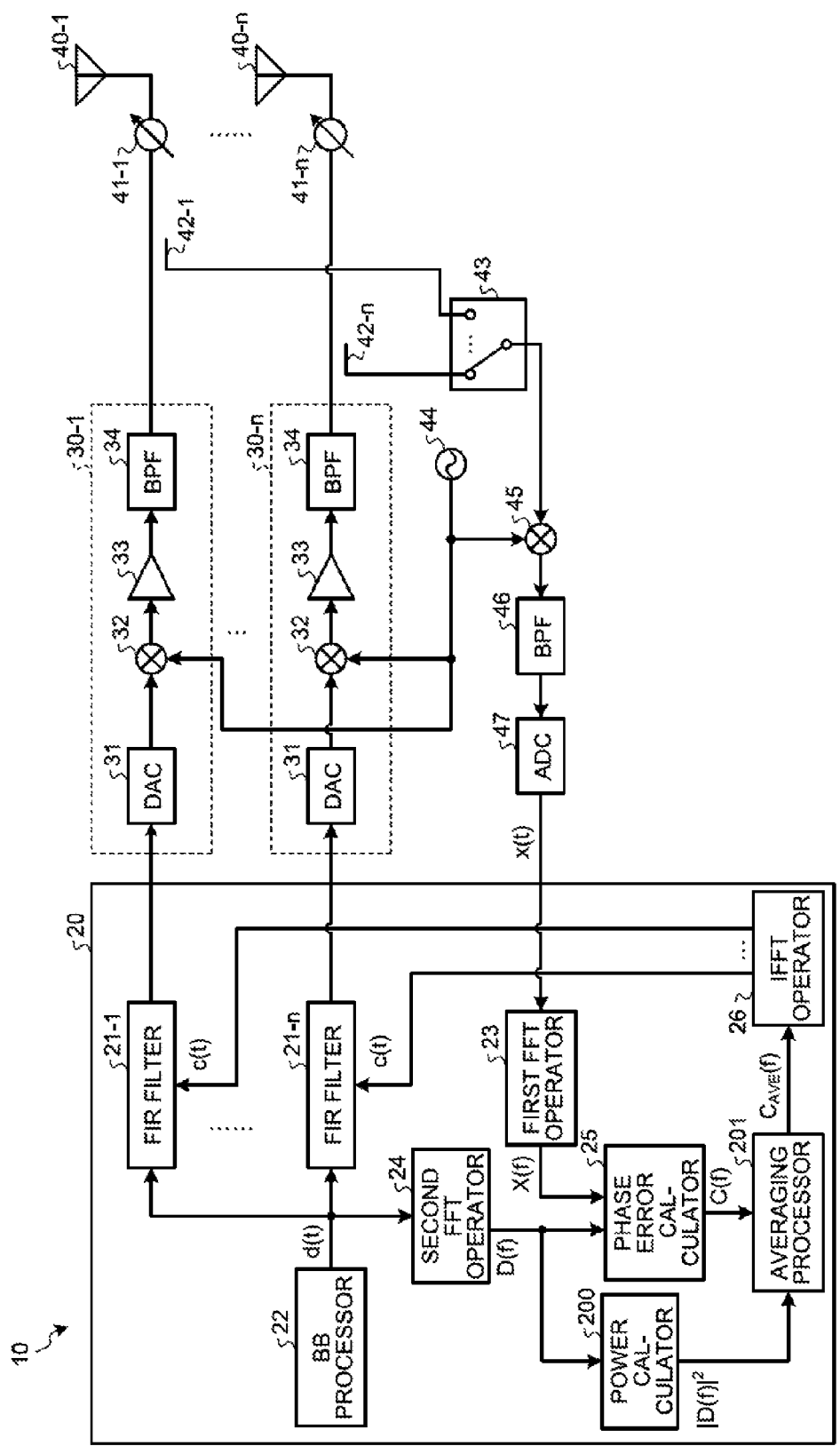
FIG. 3 is a block diagram of an exemplary base station according to a second embodiment.

FIG. 3 is a block diagram of an exemplary base station 10 according to the second embodiment. In FIG. 3, as the blocks denoted with the same numerals as those in FIG. 1 other than blocks to be described below have the same or equivalent functions as those of the blocks illustrated in FIG. 1, descriptions thereof will be omitted below.

The digital processor 20 according to the second embodiment includes the FIR filters 21-1 to 21-$n$, the BB processor 22, the first FFT operator 23, the second FFT operator 24, the phase error calculator 25, the IFFT operator 26, a power calculator 200, and an averaging processor 201.

The power calculator 200 calculates a power $|D(f)|^2$ of a transmission signal D(f) in the frequency domain that is output from the second FFT operator 24 for each FFT point. The power calculator 200 may calculate a power $|X(f)|^2$ of a feedback signal X(f) in the frequency domain.

The averaging processor 201 determines whether the transmission signal D(f) exists for each FFT point in the frequency domain. In the second embodiment, when the power $|D(f)|^2$ that is output from the power calculator 200 is larger than a predetermined threshold, the averaging processor 201 determines that there is the transmission signal D(f). When the power |D(f)|² is equal to or smaller than the threshold, the averaging processor 201 determines that the transmission signal D(f) does not exist.

On determining that the transmission signal D(f) exists, the averaging processor 201 calculates an average value $C_{AVE}(f)$ by using the phase error C(f) that is output from the phase error calculator 25. On the other hand, on determining that the transmission signal D(f) does not exist, the averaging processor 201 calculates the average value $C_{AVE}(f)$ that is calculated for the last time as the current average value $C_{AVE}(f)$ and does not use the phase error C(f) that is output from the phase error calculator 25 to calculate the average value $C_{AVE}(f)$. The averaging processor 201 outputs the calculated average value $C_{AVE}(f)$ to the IFFT operator 26. The averaging processor 201 is an exemplary output unit.

When the power |X(f)|² of the feedback signal X(f) is larger than the threshold, the averaging processor 201 may calculate the average value $C_{AVE}(f)$ by using the phase error C(f) that is output from the phase error calculator 25. The averaging processor 201 need not use the phase error C(f), which is output from the phase error calculator 25, to calculate the average value $C_{AVE}(f)$ when the power |X(f)|² is equal to or smaller than the threshold.

The phase error C(f) that is calculated with respect to a frequency in which the transmission signal D(f) does not exist is less accurate with respect to the actual phase error C(f) of the corresponding analog circuit 30. For this reason, even when each of the FIR filters 21 filters the transmission signal d(t) by using the tap coefficient c(t) that is calculated by using the phase error C(f) that is calculated with respect to the frequency in which the transmission signal D(f) does not exist, it is difficult to reduce the phase shift of the transmission signal d(t) at the output end of each of the analog circuits 30.

On the other hand, the base station 10 according to the second embodiment calculates the average value $C_{AVE}(f)$ by using the phase error C(f) with respect to a frequency in which the transmission signal D(f) exists and uses the average value $C_{AVE}(f)$ that is calculated for the last time and does not use the phase error C(f) to calculate the average value $C_{AVE}(f)$ with respect to a frequency in which the transmission signal D(f) does not exist. Accordingly, only when the transmission signal D(f) exists, the calculated phase error C(f) is used to calculate the average value $C_{AVE}(f)$. For this reason, the calculated average value $C_{AVE}(f)$ is highly accurate with respect to the actual phase errors C(f) of the corresponding analog circuit 30. Accordingly, even during the operation in which transmission is performed intermittently due to fluctuation of communication traffic, the base station 10 according to the second embodiment is able to perform highly accurate antenna calibration. Particularly also in a system in which a signal is transmitted intermittently in each frequency, such as OFDM, the base station 10 according to the second embodiment is able to determine whether the transmission signal exists for each frequency and thus perform highly accurate antenna calibration.

Procedure of Antenna Calibration

Figure 4:
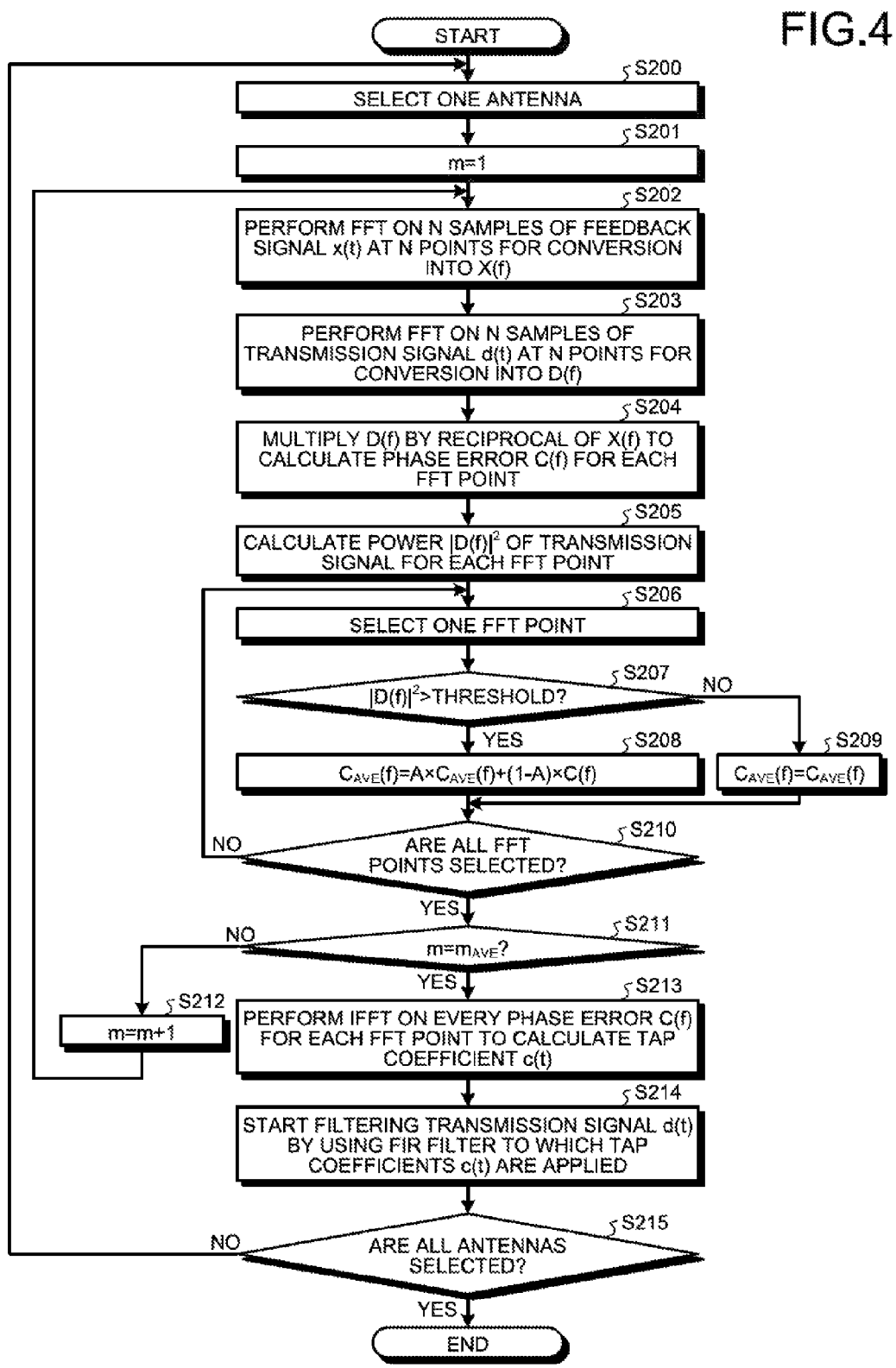
FIG. 4 is a flowchart of exemplary antenna calibration according to the second embodiment.

FIG. 4 is a flowchart of exemplary antenna calibration according to the second embodiment. The base station 10 executes the process illustrated in FIG. 4 per given timing during operation.

First of all, the selector 43 selects one of the antennas 40 (S200). The selector 43 then outputs a signal that is output from the coupler 42 corresponding to the selected antenna 40 to the downconverter 45. The signal that is output from the selector 43 is input as a feedback signal x(t) to the first FFT operator 23 via the downconverter 45, the BPF 46 and the ADC 47.

The averaging processor 201 initializes a variable m representing an average number of times to 1 S201). The first FFT operator 23 then performs FFT on N samples of the feedback signal x(t) at N points to convert the feedback signal x(t) in the time domain into a feedback signal X(f) in the frequency domain (S202).

The second FFT operator 24 then performs FFT on N samples of a baseband transmission signal d(t) at N points to convert the transmission signal d(t) in the time domain into a transmission signal D(f) in the frequency domain (S203).

The phase error calculator 25 then calculates a phase error C(f) for each FFT point by multiplying the transmission signal D(f) in the frequency domain by the reciprocal of the feedback signal X(f) in the frequency domain for each FFT point (S204).

The power calculator 200 then calculates a power |D(f)|² of the transmission signal D(f) in the frequency domain, which is output from the second FFT operator 24, for each FFT point (S205).

The averaging processor 201 selects one of the FFT points (S206) and determines whether the power |D(f)|² at the selected FFT point is larger than a predetermined threshold (S207). When the power |D(f)|² is larger than the threshold (YES at S207), the averaging processor 201 calculates an average value $C_{AVE}(f)$ by using the phase error C(f) that is output from the phase error calculator 25 according to the following Equation (1) (S208). The averaging processor 201 then executes the process at step S210.

$$C_{AVE}(f)=A\times C_{AVE}(f)+(1-A)\times C(f) \quad (1)$$

In Equation (1), A is a forgetting factor. The forgetting factor A is a positive value smaller than 1 and is, for example, 0.5 in the second embodiment.

On the other hand, when the power |D(f)|² is equal to or smaller than the threshold (NO at S207), the averaging processor 201 does not use the phase error C(f) that is output from the phase error calculator 25 and continuously uses the average value $C_{AVE}(f)$ that is calculated for the last time as the current average value $C_{AVE}(f)$ (S209).

The averaging processor 201 determines whether all the FFT points are selected (S210). When there is an unselected FFT point (NO at S210), the averaging processor 201 executes the process at step S206 again.

On the other hand, when all the FFT points are selected (YES at S210), the averaging processor 201 determines whether the variable m reaches a constant $m_{AVE}$ representing the average number of times (S211). The value of the constant $m_{AVE}$ is, for example, 10. When the variable m does not reach the constant $m_{AVE}$ (NO at S211), the averaging processor 201 increments the value of the constant m by 1 (S212). The first FFT operator 23 then executes the process at step S202 again.

When the variable m reaches the constant $m_{AVE}$ (YES at S211), the averaging processor 201 outputs the average value $C_{AVE}(f)$ for each FFT point to the IFFT operator 26. The IFFT operator 26 performs IFFT on the average value $C_{AVE}(f)$ for each FFT point, which is output from the averaging processor 201, to calculate a tap coefficient c(f) of each tap of the FIR filter 21 (S213). The IFFT operator 26 then outputs the calculated tap coefficients c(t) to the FIR filter 1 that filters the transmission signal that is input to the analog circuit 30 corresponding to the coupler 42 that is selected by the selector 43.

The FIR filter 21 then starts filtering processing of filtering the transmission signal d(t), which is output from the BB processor 22, on the basis of the tap coefficients c(t) that are output from the IFFT operator 26 and outputting the transmission signal d(t) to the corresponding analog circuit 30 (S214).

The selector 43 then determines whether all the antennas 40 are selected (S215). When there is the antenna 40 unselected (NO at S215), the selector 43 executes the process at step S200 again. On the other hand, when all the antennas 40 are selected (YES at S215), the base station 10 ends the antenna calibration illustrated in the flowchart.

Effect of Second Embodiment

As it is clear from the above descriptions, in the second embodiment, the first FFT operator 23 calculates, for each FFT point, the phase error C(f) representing the inverse characteristic of the phase characteristic in the frequency domain by multiplying the transmission signal D(f) in the frequency domain by the reciprocal of the feedback signal X(f) of the frequency domain. The base station 10 according to the second embodiment includes the averaging processor 201 that, with respect to each of the analog circuits 30, determines whether a transmission signal D(f) exists for each FFT point, calculates an average value $C_{AVE}(f)$ by using the phase error C(f) that is calculated by the first FFT operator 23 with respect to the FFT point at which it is determined that the transmission signal D(f) exists, calculates the average value $C_{AVE}(f)$ that is calculated for the last time as the current average value $C_{AVE}(f)$ with respect to the FFT point at which it is determined that the transmission signal D(f) does not exist, and outputs the calculated average value $C_{AVE}(f)$ to the IFFT operator 26. The IFFT operator 26 calculates, for each FFT point, a tap coefficient c(t) by using the average value $C_{AVE}(f)$ of the inverse characteristic of the phase characteristic of the analog circuit 30 that is output from the averaging processor 201.

Accordingly, with respect to each frequency, an average value $C_{AVE}(f)$ is calculated by using the phase error C(f) in the case where the transmission signal D(f) exists. Thus, the calculated average value $C_{AVE}(f)$ is a value close to the actual phase error C(f) of the corresponding analog circuit 30. Accordingly, even during operation in which transmission is performed intermittently due to fluctuation of communication traffic, the base station 10 according to the second embodiment is able to perform highly accurate accurate antenna calibration. Particularly also in a system in which a signal is transmitted intermittently in each frequency, the base station 10 according to the second embodiment is able to determine whether the transmission signal exists for each frequency and thus perform highly accurate antenna calibration.

[c] Third Embodiment

Figure 5:
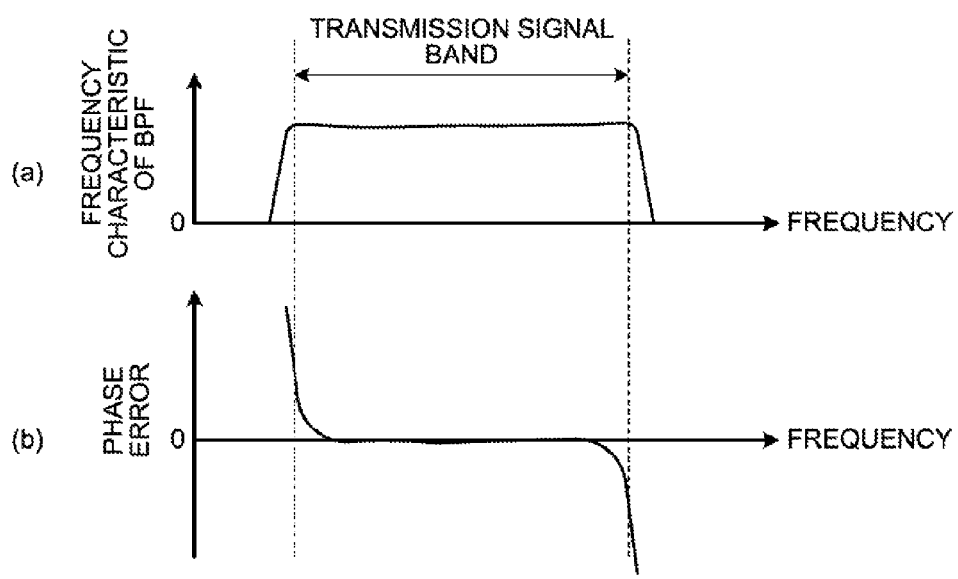
FIG. 5 is a diagram illustrating an exemplary characteristic of a BPF.

Each of the analog circuits 30 is provided with the BPF 34. As illustrated in FIG. 5(a), each of the BPFS 34 has a passband according to a transmission signal band that is allocated to the base station 10. In each of the base stations 10, power leaked to the outside of the transmission signal band is strictly restricted by law. To meet the restriction, each of the base stations 10 is provided with the BPF 34 designed to achieve precipitous attenuation characteristic outside the transmission signal band.

In the BPF 34, however, as the attenuation characteristic outside the transmission single band is precipitous, for example, as illustrated in FIG. 5(b), the phase error may increase rapidly near the frequencies at both ends of the transmission signal band. In this case, it is difficult to accurately calculate the phase errors resulting from the BPF 34. For this reason, the difference between the calculated phase errors and the actual phase errors in the analog circuit 30 increases and thus it is difficult to accurately correct the phase errors of the analog circuit 30 with respect to the transmission signal. When the phase errors are equal among the analog circuits 30, it is assumed that the phases of the transmission signals are uniform at the output ends of the analog circuits 30; however, as the BPFS 34 are analog parts, the curve of a rapid increase of phase error near the frequencies at both ends of the transmission signal band generally differs in each BPF 34. For this reason, the phases of the transmission signals differ among the analog circuits. Thus, it is difficult to reduce the phase errors among the analog circuits 30 near the frequencies at both ends of the transmission signal band.

Figure 6A:
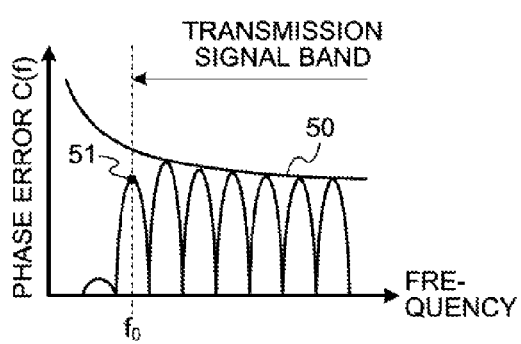
FIGS. 6A and 6B are diagrams illustrating exemplary replacement processing.

For example, a case will be considered where the characteristic of the phase error C(f) of the analog circuit 30 containing the characteristic of the BPF 34 varies as represented by a curve 50 near the frequencies at both ends of the transmission signal band as illustrated in FIG. 6A. In this case, the phase error C(f) that is calculated by the phase error calculator 25 at an FFT point $f_0$ corresponding to the outermost frequency in the transmission signal band may be calculated as a value distant from the values on the curve 50 (for example, a point 51 represented in FIG. 6A due to, for example, the resolution of FFT. In this case, the phase error C(f) that is calculated by the phase error calculator 25 of the digital processor 20 is a value different from the original phase error C(f) of the analog circuit 30. For this reason, when the phase errors C(f) that are calculated by the phase error calculator 25 are used directly, it is difficult to accurately correct the phase errors of the analog circuit 30.

Figure 6B:
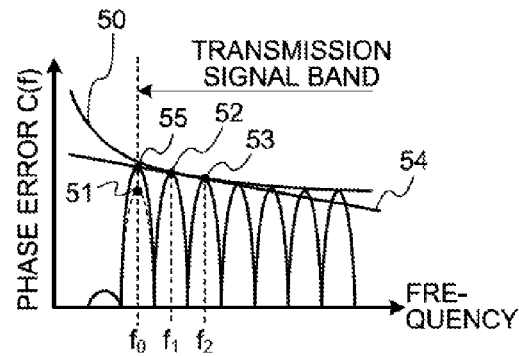

To deal with this, according to the third embodiment, the value of the phase error C(f) at the FFT point $f_0$ is estimated on the basis of the value of the phase error C(f) at an FFT point $f_1$ adjacent to the FFT point $f_0$ and the value of the phase error C(f) at an FFT point $f_2$ adjacent to the FFT point $f_1$. Specifically, as illustrated in FIG. 6B, the value (a point 55) on a line 54 connecting the value (a point 52) of the phase error C(f) at the FFT point $f_1$ and the value (a point 53) of the phase error C(f) at the FFT point $f_2$ is estimated as the value of the phase error C(f) at the FFT point $f_0$. Then, replacement processing of replacing the calculated value (the point 51) of the phase error C(f) with the estimated value (the point 55) of the phase error C(f) is performed at the FFT point $f_0$. Accordingly, the estimated phase errors C(f) are values close to the original phase errors C(f) of the analog circuit 30 and accordingly it is possible to correct the phase errors of the analog circuit 30 accurately. In the third embodiment, the replacement processing is performed on the average value $C_{AVE}(f)$ that is the averaged phase error C(f).

Configuration of Base Station 10

FIG. 7 is a block diagram of the exemplary base station 10 according to the third embodiment. In FIG. 7, as the blocks denoted with the same numerals as those in FIG. 3 other than blocks to be described below have the same or similar functions as those of the blocks illustrated in FIG. 3, descriptions thereof will be omitted below.

The digital processor 20 according to the second embodiment includes the FIR filters 21-1 to 21-n, the BB processor 22, the first FFT operator 23, the second FFT operator 24, the phase error calculator 25, and the IFFT operator 26. The digital processor 20 according to the third embodiment further includes the power calculator 200, the averaging processor 201, and a replacement unit 202.

The replacement unit 202 acquires an average value $C_{AVE}(f)$ for each FFT point from the averaging processor 201. The replacement unit 202 executes the following replacement processing with respect to each of the FFT points corresponding to the two outermost frequencies in the transmission signal band. First of all, the replacement unit 202 specifies an FFT point $f_1$ adjacent to an FFT point $f_0$ corresponding to the outermost frequency in a transmission signal band and an FFT point $f_2$ adjacent to the FFT point $f_1$. The FFT point $f_0$ is an exemplary first frequency, the FFT point $f_1$ is an exemplary second frequency, and the FFT point $f_2$ is an exemplary third frequency.

The replacement unit 202 specifies a straight line (for example, a line 54 in FIG. 6B connecting the average value $C_{AVE}(f)$ at the FFT point $f_1$ (for example, the point 52 in FIG. 6B and the average value $C_{AVE}(f)$ at the FFT point $f_2$ (for example, the point 53 in FIG. 6B. The replacement unit 202 then estimates a value (for example, the point 55 in FIG. 6B on the specified straight line as the average value $C_{AVE}(f)$ at the FFT point $f_0$. The replacement unit 202 then replaces the average value $C_{AVE}(f)$ (for example, the point 51 in FIG. 6B at the FFT point $f_0$ that is output from the averaging processor 201 with the estimated average value $C_{AVE}(f)$ (for example, the point 55 in FIG. 6B. The average value $C_{AVE}(f)$ at the FFT point $f_{N-1}$ corresponding to the frequency at the top end of the transmission signal band is replaced with a value on a straight line connecting an average value $C_{AVE}(f)$ at an FFT point $f_{N-3}$ and an average value $C_{AVE}(f)$ at an FFT point $f_{N-2}$. The replacement unit 202 outputs the average value $C_{AVE}'(f)$ with which the average value $C_{AVE}(f)$ at the FFT point corresponding to the outermost frequency in the transmission signal band to the IFFT operator 26. The IFFT operator 26 performs IFFT on the average value $C_{AVE}(f)$, which is output from the replacement unit 202, to calculate a tap coefficient $c(t)$ of each tap of the FIR filter 21.

Procedure of Antenna Calibration

Figure 8:
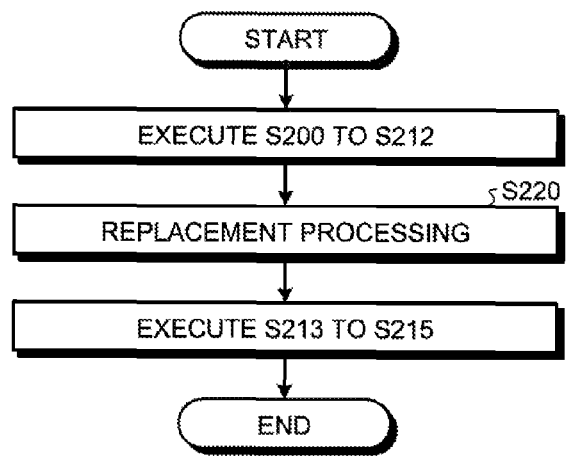
FIG. 8 is a flowchart of exemplary antenna calibration according to the third embodiment.

FIG. 8 is a flowchart of exemplary antenna calibration according to the third embodiment. The base station 10 executes the process illustrated in FIG. 8 per given timing during operation. FIG. 8 illustrates the process different from that according to the flowchart of antenna calibration illustrated in FIG. 4.

In the antenna calibration according to the third embodiment, first of all, as in the antenna calibration illustrated in FIG. 4, the process at steps S200 to S211 is executed. The replacement unit 202 then acquires an average value $C_{AVE}(f)$ for each FFT point from the averaging processor 201 and performs the replacement processing described with reference to FIG. 7 (S220). Then, as in the antenna calibration illustrated in FIG. 4, the processes at steps S213 to S215 are executed.

In the replacement processing at step S220, with respect to the FFT points corresponding to the frequencies at both ends of the transmission signal band, the average values $C_{AVE}(f)$ that are calculated by the averaging processor 201 are replaced with the estimated average values $C_{AVE}(f)$. For this reason, with respect to the FFT points corresponding to the frequencies at both ends of the transmission signal band, calculation of an average value $C_{AVE}(f)$ may be omitted.

Effect of Third Embodiment

As it is clear from the above descriptions, the base station 10 according to the third embodiment includes the replacement unit 202. The replacement unit 202 replaces, with respect to each of the analog circuits 30, the average value $C_{AVE}(f)$ at the FFT point $f_0$ in the outermost position in the frequency band of the transmission signal $D(f)$ among the average values $C_{AVE}(f)$ that are output from the averaging processor 201 for the respective FFT points with the value on the straight line passing though the average value $C_{AVE}(f)$ at the FFT point $f_1$ adjacent to the FFT point $f_0$ and the average value $C_{AVE}(f)$ at the FFT point $f_2$ adjacent to the FFT point $f_1$. The IFFT operator 26 calculates the tap coefficients $c(t)$ by using the average values $C_{AVE}(f)$ containing the value with which the replacement unit 202 replaces the e average value $C_{AVE}(f)$.

Accordingly, it is possible to more authentically estimate the characteristic of the phase errors $C(F)$ of the analog circuit 30 containing the characteristic of the BPF 34 near the frequencies at both ends of the transmission signal band. Accordingly, the estimated phase errors $C(f)$ are values close to the original phase errors $C(f)$ of the analog circuit 30 and thus it is possible to accurately correct the phase errors of the analog circuit 30.

[d] Fourth Embodiment

The FIR filter 21 has a desirable passing characteristic in the transmission signal band and has a cutoff area in order not to cause unnecessary signals outside the transmission signal band. For this reason, the frequency response of the FIR filter 21 is, for example, as illustrated in FIG. 9A, a rectangular frequency response that has a desired passing characteristic in a transmission signal band $\Delta f_0$ and that rapidly attenuates outside the transmission signal band $\Delta f_0$.

Figure 9A:
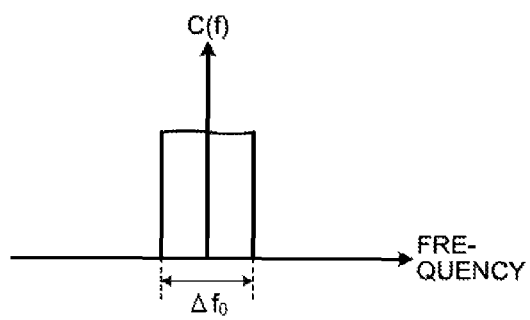
FIGS. 9A and 9B are diagrams illustrating an exemplary frequency response.
Figure 9B:
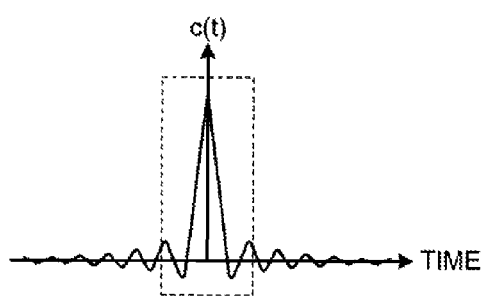

Replacing the frequency response of the FIR filter 21 illustrated in FIG. 9A with a time response of the FIR filter 21 in the time domain leads to, for example, the distribution illustrated in FIG. 9B. When the frequency response of the FIR filter 21 is rectangular, a lot of high-frequency components are contained and thus the time response of the FIR filter 21 varies as can be seen in a sinc function and the number of taps of the FIR filter increases. In this case, it is difficult to reproduce the rectangular frequency response illustrated in FIG. 9A by using the number of taps (for example, 32) expressing the time response within the area surrounded by the dotted line in FIG. 9B.

Figure 10A:
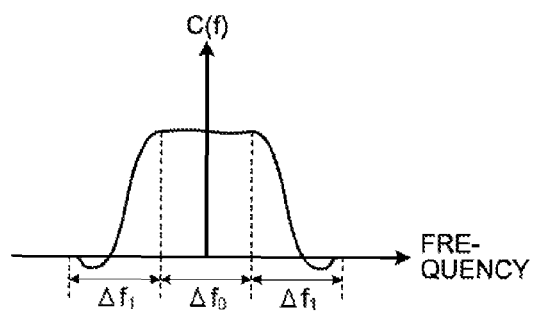
FIGS. 10A and 10B are diagrams illustrating exemplary smoothing processing.
Figure 10B:
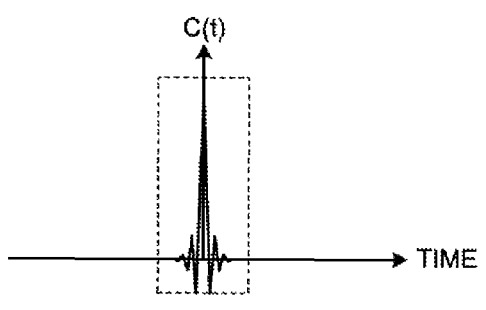

On the other hand, when smoothing processing for causing the frequency response to gently attenuate outside the transmission signal band $\Delta f_0$ as illustrated in FIG. 10A is performed, the high-frequency components contained in the frequency response of the FIR filter 21 reduce. Accordingly, the time response of the FIR filter 21 concentrates on the time in a given area, for example, as illustrated in FIG. 10B. For this reason, even when the number of taps (for example, 32) expressing the time response within the area surrounded by the dotted line in FIG. 10B is used, it is possible to reproduce the frequency response illustrated in FIG. 10A after the smoothing processing. Accordingly, it is possible to reduce the number of taps of the FIR filter 21 and thus reduce the circuit scale of the FIR filter 21.

In the smoothing processing according to the fourth embodiment, the amplitude gently attenuates to 0 in the frequency area $\Delta f_1$ outside the transmission signal band $\Delta f_0$. It is assumed that, in order to reduce the number of taps of the FIR filter 21 for which tap coefficients are set in the time domain, the frequency response is made flat without reducing the amplitude over the whole band outside the transmission signal band $\Delta f_0$. Making the frequency response of the FIR filter 21 flat however increases calculation processes.

For this reason, it is preferable that the amplitude be reduced to 0 gently outside the transmission signal band $\Delta f_0$. In the fourth embodiment, outside the transmission signal band $\Delta f_0$, the amplitude is reduced to 0 in the frequency area $\Delta f_0$ having the same width as that of the transmission signal band $\Delta f_0$.

Configuration of Base Station 10

Figure 11:
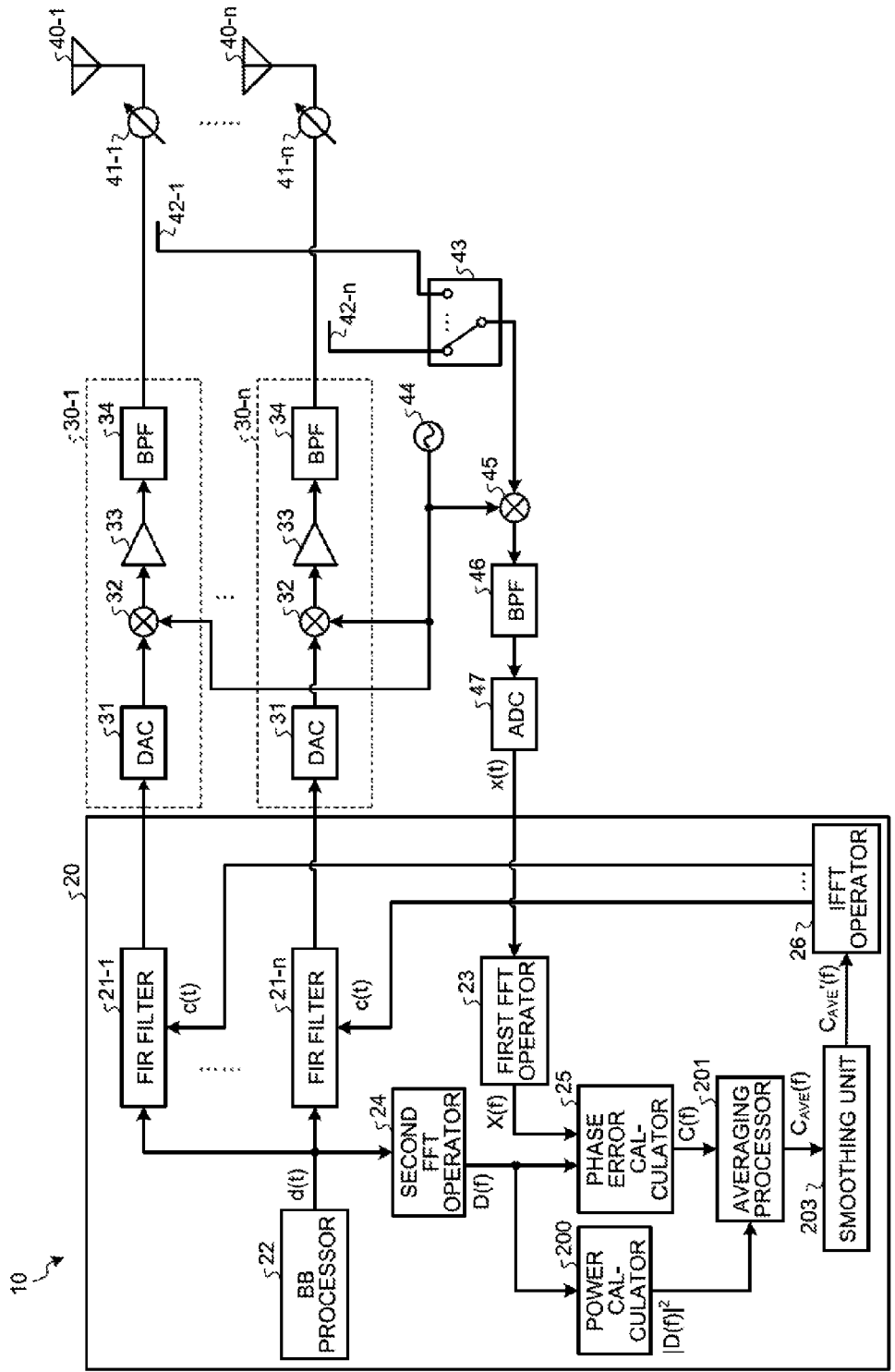
FIG. 11 is a block diagram of an exemplary base station according to a fourth embodiment.

FIG. 11 is a block diagram of the exemplary base station 10 according to the fourth embodiment. In FIG. 11, as the blocks denoted with the same numerals as those in FIG. 3 other than blocks to be described below have the same or similar functions as those of the blocks illustrated in FIG. 3, descriptions thereof will be omitted below.

The digital processor 20 according to the fourth embodiment includes the FIR filters 21-1 to 21-n, the BB processor 22, the first FFT operator 23, the second FFT operator 24, the phase error calculator 25, and the IFFT operator 26. The digital processor 20 according to the third embodiment further includes the power calculator 200, the averaging processor 201, and a smoothing unit 203.

The smoothing unit 203 acquires average values $C_{AVE}(f)$ for respective FFT points from the averaging processor 201. The smoothing unit 203 then performs the following smoothing processing with respect to each of the FFT points corresponding to the frequencies outside the transmission signal band $\Delta f_0$. The smoothing unit 203 adds average values $C_{AVE}(f)$ at FFT points such that, the frequency response gently attenuates from the average value $C_{AVE}(f)$ for the FFT point corresponding to the outermost frequency in the transmission signal band $\Delta f_0$ to 0 in the area $\Delta f_1$ outside the transmission signal band $\Delta f_0$. The smoothing unit 203 then outputs the average values $C_{AVE}'(f)$ containing the added average values $C_{AVE}(f)$ for the FFT points to the IFFT operator 26. The IFFT operator 26 performs IFFT on the average values $C_{AVE}'(f)$ that are output from the smoothing unit 203 to calculate tap coefficients c(t) of respective taps of the FIR filter 21.

Procedure of Antenna Calibration

Figure 12:
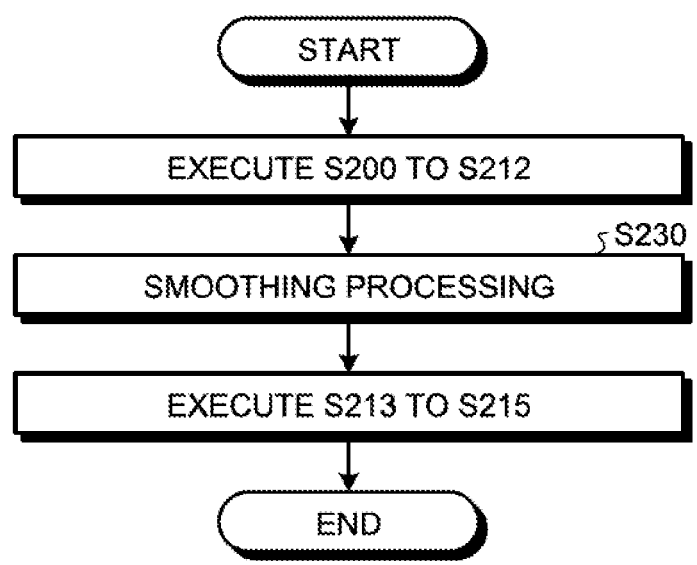
FIG. 12 is a flowchart of exemplary antenna calibration according to the fourth embodiment.

FIG. 12 is a flowchart of exemplary antenna calibration according to the fourth embodiment. The base station 10 executes the process illustrated in FIG. 12 per given timing during operation. FIG. 12 illustrates the process different from that according to the flowchart of antenna calibration illustrated in FIG. 4.

In the antenna calibration according to the fourth embodiment, first of all, as in the antenna calibration illustrated in FIG. 4, the processes at steps S200 to S211 are executed. The smoothing unit 203 then acquires average values $C_{AVE}(f)$ for respective FFT points from the averaging processor 201 and performs the smoothing processing described with reference to FIGS. 10A and 10B (S230). Then, as in the antenna calibration illustrated in FIG. 4, the process at steps S213 to S215 is executed.

Effect of Fourth Embodiment

As it is clear from the above descriptions, the base station 10 according to the fourth embodiment includes the smoothing unit 203. The smoothing unit 203 performs, with respect to each of the analog circuits 30, smoothing such that the average value $C_{AVE}(f)$ that is output for each FFT point from the averaging processor 201 gently attenuates in the frequency band outside the frequency band of the transmission signal D(f). The IFFT operator 26 calculates tap coefficients of the FIR filter 21 by using the average values $C_{AVE}'(f)$ smoothed by the smoothing unit 203. Accordingly, it is possible to reduce the number of taps of the FIR filter 21 and thus reduce the circuit scale of the FIR filter 21.

[e] Fifth Embodiment

Configuration of Base Station 10

Figure 13:
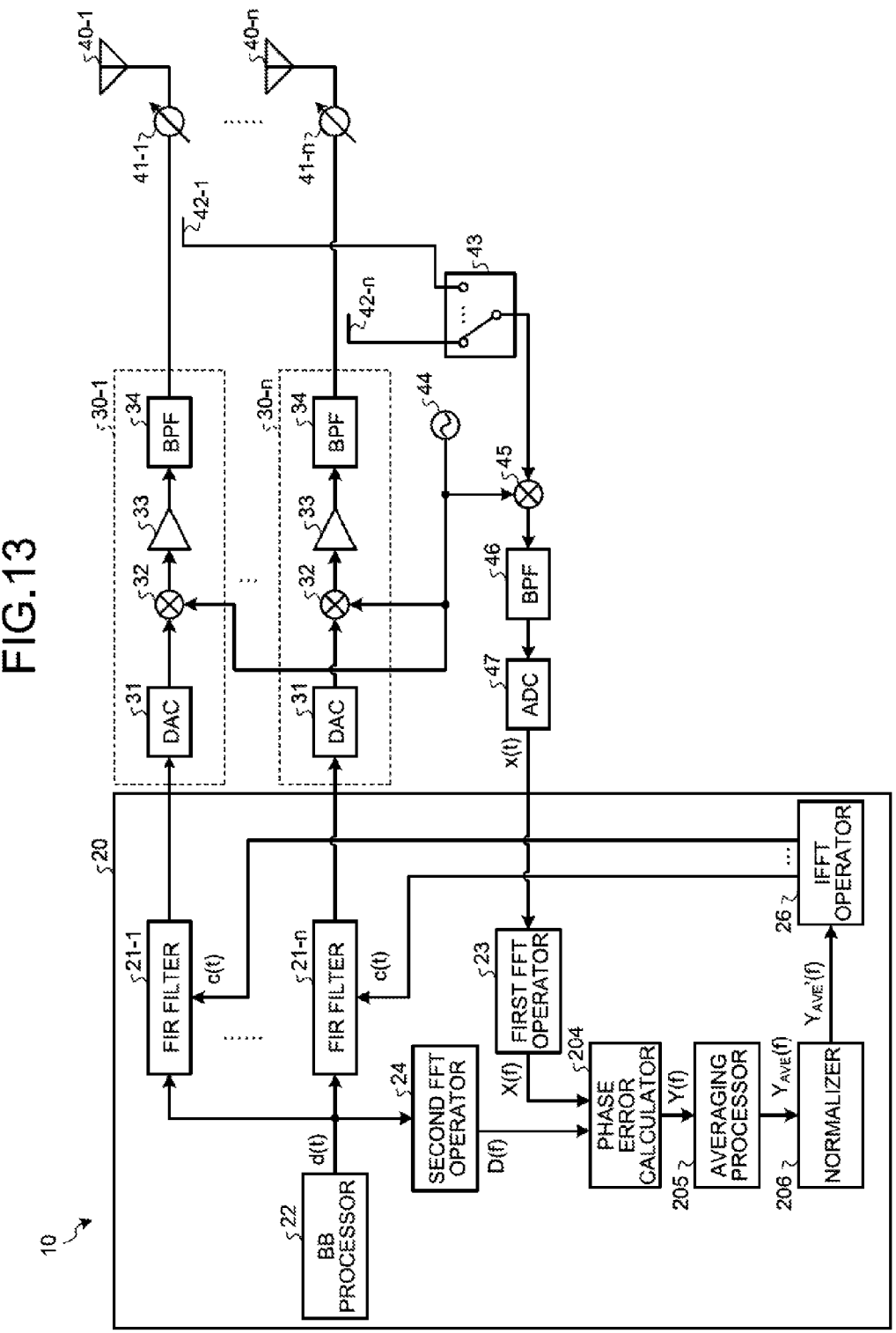
FIG. 13 is a block diagram of an exemplary base station according to a fifth embodiment.

FIG. 13 is a block diagram of the exemplary base station 10 according to the fifth embodiment. In FIG. 13, as the blocks denoted with the same numerals as those in FIG. 3 other than blocks to be described below have the same or similar functions as those of the blocks illustrated in FIG. 3, descriptions thereof will be omitted below.

The digital processor 20 according to the fifth embodiment includes the FIR filters 21-1 to 21-n, the BB processor 22, the first FFT operator 23, the second FFT operator 24, the IFFT operator 26, a phase error calculator 204, an averaging processor 205, and a normalizer 206.

The phase error calculator 204 calculates a phase error Y(f) for each FFT point on the basis of a transmission signal D(f) and a feedback signal X(f) in the frequency domain. The phase error calculator 204 outputs the calculated phase errors Y(f) to the averaging processor 205. In the fifth embodiment, the phase error calculator 204 calculates the phase error Y(f) for each FFT point by multiplying the transmission signal D(f) by a complex conjugate X*(f) of a feedback signal X(f) for each FFT point. The phase error Y(f) is a value representing the inverse characteristic of the phase characteristic of the analog circuit 30 and corresponding to the magnitude of the transmission signal D(f). For this reason, when the transmission signal D(f) does not exist, the phase error Y(f) is a very small value. The phase error calculator 204 is an exemplary first calculator.

The averaging processor 205 calculates, for each FFT point, an average value $Y_{AVE}(f)$ by averaging a given number of phase errors V(f) from the phase error calculator 204. The averaging processor 205 outputs the calculated average values $Y_{AVE}(f)$ to the normalizer 206. When the phase error Y(f) in the case where the transmission signal D(f) does not exist is contained, the value of the average value $Y_{AVE}(f)$ that is calculated by the averaging processor 205 reduces. The averaging processor 205 may calculate an average value $Y_{AVE}(f)$ by using a forgetting factor.

The normalizer 206 normalizes the average value $Y_{AVE}(f)$ that is output from the averaging processor 205 for each FFT point to calculate an average value $Y_{AVE}'(f)$. The normalizer 206 then outputs the normalized average values $Y_{AVE}'(f)$ to the IFFT operator 26. In the fifth embodiment, the phase error calculator 204 calculates the normalized average value $Y_{AVE}'(f)$ for each FFT point according to the following Equation (2).

$$Y_{AVE}'(f) = Y_{AVE}(f)/|Y_{AVE}(f)| \qquad (2)$$

As described above, with respect to the average value $Y_{AVE}(f)$ containing the phase error Y(f) in the case where the transmission signal D(f) does not exist, normalizing the average value $Y_{AVE}(f)$ reduces the effect of the phase error Y(f) in the case where the transmission signal D(f) does not exist. For this reason, the normalized average value $Y_{AVE}'(f)$ is a value close to the average value $Y_{AVE}(f)$ that is calculated without the value of the phase error Y(f) in the case where the transmission signal D(f) does not exist. Accordingly, the normalized average value $Y_{AVE}'(f)$ mainly contains the phase error Y(f) in the case where the transmission signal D(f) exists and, even when transmission is performed intermittently, it is possible to accurately calculate phase errors of each of the analog circuits 30.

The IFFT operator 26 executes IFFT on the average value $Y_{AVE}'(f)$ for each FFT point that is output from the normalizer 206 to calculate a tap coefficient c(t) of each tap of the FIR filter 21.

Procedure of Antenna Calibration

Figure 14:
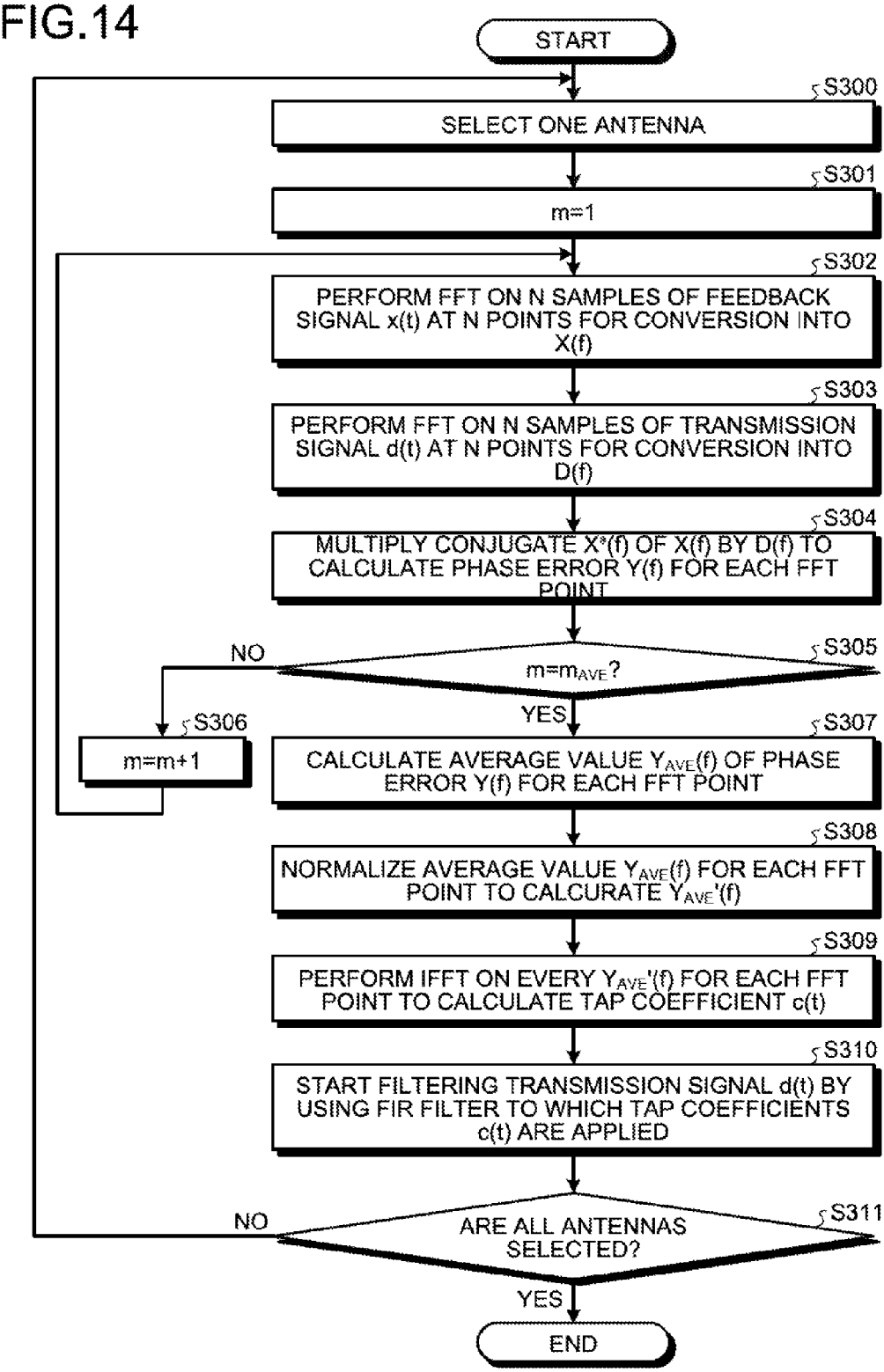
FIG. 14 is a flowchart of exemplary antenna calibration according to the fifth embodiment.

FIG. 14 is a flowchart of exemplary antenna calibration according to the fifth embodiment. The base station 10 executes the process illustrated in FIG. 14 per given timing during operation.

First of all, the selector 43 selects one of the antennas 40 (S300). The selector 43 then outputs a signal that is output from the coupler 42 corresponding to the selected antenna 40 to the downconverter 45. The signal that is output from the selector 43 is input as a feedback signal x(t) to the first FFT operator 23 via the downconverter 45, the BPF 46 and the ADC 47.

The averaging processor 205 initializes a variable m representing an average number of times to 1 S301). The first FFT operator 23 then performs FFT on N samples of the feedback signal x(t) at N points to convert the feedback signal x(t) in the time domain into the feedback signal X(f) in the frequency domain (S302).

The second FFT operator 24 then performs FFT on N samples of a baseband transmission signal d(t) at N points to convert the transmission signal d(t) in the time domain into a transmission signal D(f) in the frequency domain (S303).

The phase error calculator 204 then calculate a phase error Y(f) for each FFT point by multiplying the transmission signal D(f) by the complex conjugate X*(f) of the feedback signal X(f) to (S304).

The averaging processor 205 then determines whether the variable m reaches a constant $m_{AVE}$ representing the average number of times (S305). When the variable m does not reach $m_{AVE}$ (NO at S305), the averaging processor 205 increments the value of the variable m by 1 (S306). The first FFT operator 23 then executes the process illustrated at step S302 again.

On the other hand, when the variable m reaches the constant $m_{AVE}$ (YES at S305), the averaging processor 205 averages phase errors Y(f) for each FFT point to calculate the average value $Y_{AVE}(f)$ by (S307). The averaging processor 205 then outputs the calculated average values $Y_{AVE}(f)$ to the normalizer 206.

The normalizer 206 then normalizes the average value $Y_{AVE}(f)$, which is output from the averaging processor 205, for each FFT point according to Equation (2) given above to calculate an average value $Y_{AVE}'(f)$ (S308). The normalizer 206 then outputs the calculated average values $Y_{AVE}'(f)$ to the IFFT operator 26.

The IFFT operator 26 then performs IFFT on the average value $Y_{AVE}'(f)$ for each FFT point, which is output from the normalizer 206, to calculate a tap coefficient of each tap of the FIR filter 21 (S309). The IFFT operator 26 outputs the calculated tap coefficients to the FIR filter 21 that filters the transmission signal that is input to the analog circuit 30 corresponding to the coupler 42 selected by the selector 43.

The FIR filter 21 then starts the filtering processing of filtering the transmission signal d(t) that is output from the BB processor 22 on the basis of the tap coefficients c(t) that are output from the IFFT operator 26 and outputting the filtered transmission signal d(t) to the corresponding analog circuit 30 (S310).

The selector 43 then determines whether all the antennas 40 are selected (S311). When there is the antenna 40 unselected (NO at S311), the selector 43 executes the process at step S300 again. On the other hand, when all the antennas 40 are selected (YES at S311), the base station 10 ends the antenna calibration illustrated in the flowchart.

Effect of Fifth Embodiment

As it is clear from the above descriptions, in the fifth embodiment, the phase error calculator 204 calculates the phase error Y(f) representing the inverse characteristic of the phase characteristic of each of given frequencies in the frequency domain by multiplying the transmission signal D(f) by the complex conjugate X*(f) of the feedback signal X(f). The normalizer 206 then, with respect to each of the analog circuits 30, normalizes the average value $Y_{AVE}(f)$ of phase errors Y(f) for each of the FFT points. The IFFT operator 26 calculates tap coefficients c(t) of the FIR filter 21 by using the average values $Y_{AVE}'(f)$ that are normalized by the normalizer 206 at the respective FFT points.

Accordingly, as the average value $Y_{AVE}'(f)$ containing the phase error Y(f) with respect to the frequency in which the transmission signal D(f) exists is calculated mainly, the calculated average value $Y_{AVE}'(f)$ is a value close to the phase error Y(f) that the corresponding analog circuit 30 actually has. Accordingly, even during the operation in which transmission is performed intermittently due to fluctuation of communication traffic, the base station 10 of the fifth embodiment is able to perform highly accurate antenna calibration. Particularly also in a system in which a signal is transmitted intermittently in each frequency, such as OFDM, the base station 10 according to the fifth embodiment is able to determine whether the transmission signal exists for each frequency and thus perform highly accurate antenna calibration.

[f] Sixth Embodiment

Configuration of Base Station 10

Figure 15:
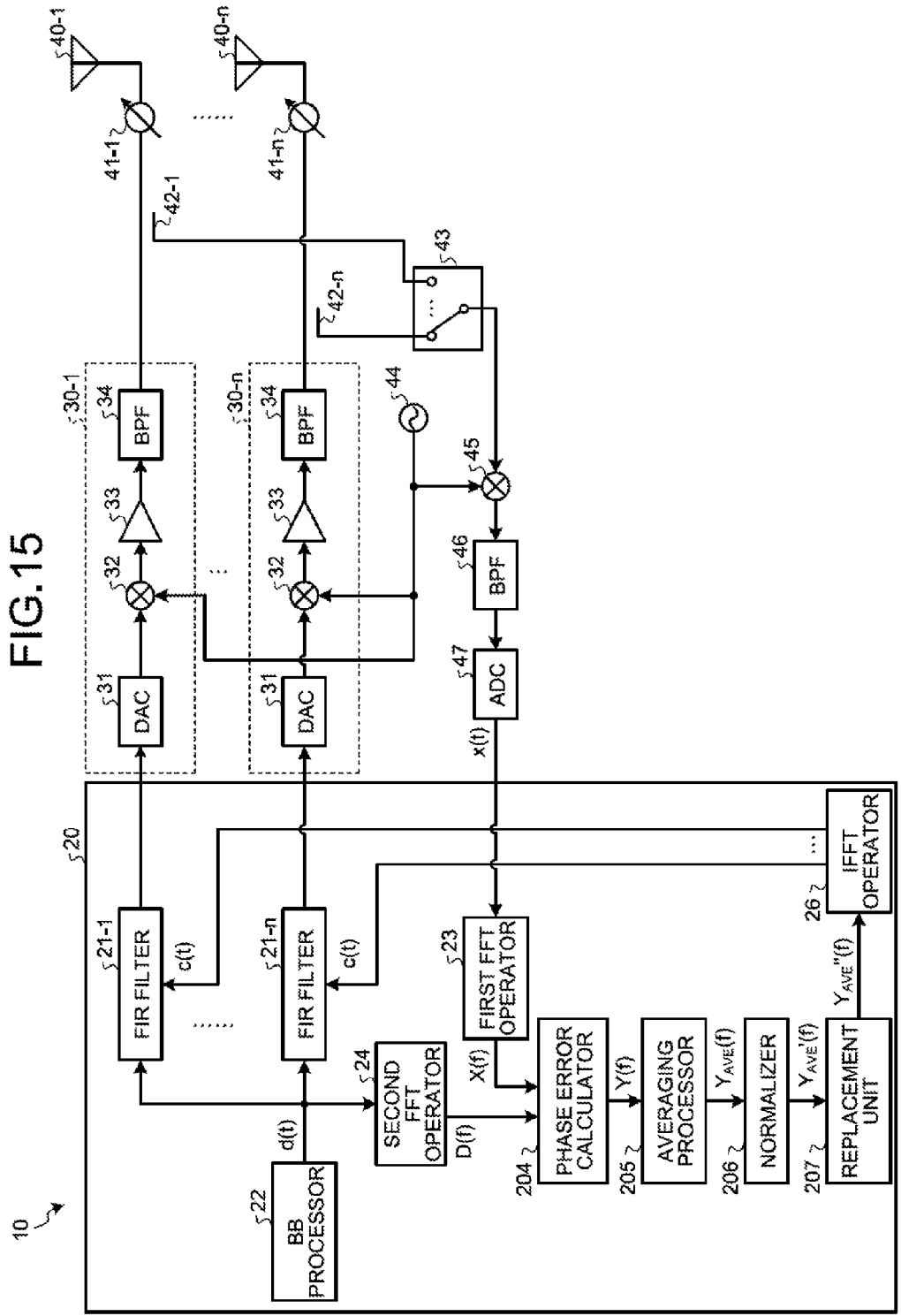
FIG. 15 is a block diagram of an exemplary base station according to a sixth embodiment.

A sixth embodiment is an embodiment of a combination of the third embodiment and the fifth embodiment. FIG. 15 is a block diagram of the exemplary base station 10 according to the sixth embodiment. In FIG. 15, as the blocks denoted with the same numerals as those in FIG. 13 other than blocks to be described below have the same or similar functions as those of the blocks illustrated in FIG. 13, descriptions thereof will be omitted below.

The digital processor 20 according to the sixth embodiment includes the FIR filters 21-1 to 21-n, the BB processor 22, the first FFT operator 23, the second FFT operator 24, and the IFFT operator 26. The digital processor 20 according to the sixth embodiment further includes the phase error calculator 204, the averaging processor 205, the normalizer 206, and a replacement unit 207.

The replacement unit 207 acquires an average value $Y_{AVE}'(f)$ for each FFT point from the normalizer 206. The replacement unit 207 then executes the replacement processing as the replacement unit 202 according to the third embodiment does with respect to each of the FFT points corresponding to the two outermost frequencies in a transmission signal band $\Delta f_0$. The replacement unit 207 then outputs the average value $Y_{AVE}''(f)$ with which the average value $Y_{AVE}'(f)$ at the FFT point corresponding to the outermost frequency in the transmission signal band $\Delta f_0$ is replaced to the IFFT operator 26. The IFFT operator 26 performs IFFT on the average values $Y_{AVE}''(f)$, which are output from the replacement unit 207, to calculate tap coefficients c(t) of respective taps of the FIR filter 21.

Procedure of Antenna Calibration

Figure 16:
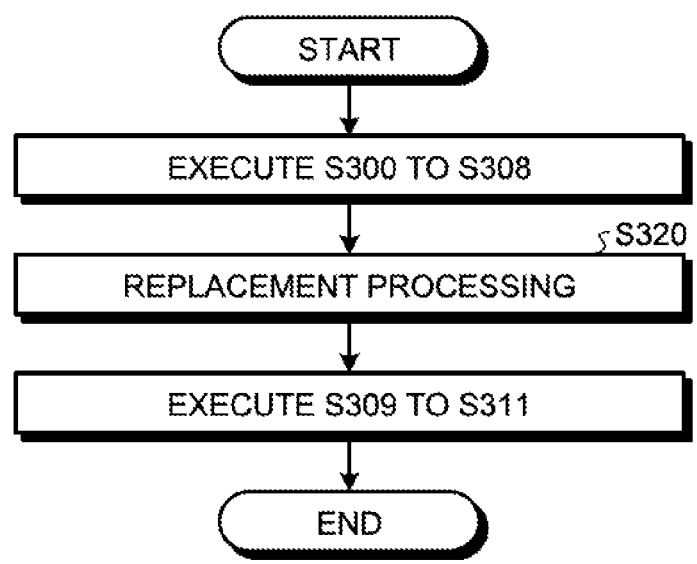
FIG. 16 is a flowchart of exemplary antenna calibration according to the sixth embodiment.

FIG. 16 is a flowchart of exemplary antenna calibration according to the sixth embodiment. The base station 10 executes the process illustrated in FIG. 16 per given timing during operation. FIG. 16 illustrates the process different from that according to the flowchart of antenna calibration illustrated in FIG. 14.

In the antenna calibration according to the sixth embodiment, first of all, as in the antenna calibration illustrated in FIG. 14, the process at steps S300 to S308 is executed. The replacement unit 207 then acquires an average value $Y_{AVE}'(f)$ for each FFT point from the normalizer 206 and executes the replacement processing with respect to each of the FFT points corresponding to the two outermost frequencies in the transmission signal band $\Delta f_0$ (S320). Then, as in the antenna calibration illustrated in FIG. 14, the process at steps S309 to S311 is executed.

In the replacement processing at step S320, with respect to the FFT points corresponding to the frequencies at both ends of the transmission signal band $\Delta f_0$, the average values $Y_{AVE}'(f)$ that are normalized by the normalizer 206 are replaced with the estimated average values $Y_{AVE}'(f)$. For this reason, with respect to the FFT points corresponding to the frequencies at both ends of the transmission signal band $\Delta f_0$, the process of calculating an average value $Y_{AVE}(f)$ performed by the averaging processor 205 and the process of normalizing an average value $Y_{AVE}(f)$ performed by the normalizer 206 may be omitted.

Effect of Sixth Embodiment

As it is clear from the above descriptions, the base station 10 according to the sixth embodiment includes the replacement unit 207. The replacement unit 207 replaces, with respect to each of the analog circuits 30, the average value $Y_{AVE}'(f)$ at the FFT point $f_0$ in the outermost position in the frequency band of the transmission signal D(f) among the average values $Y_{AVE}'(f)$, which are normalized by the normalizer 206 for the respective FFT points, with a value on the straight line passing through the average value $Y_{AVE}'(f)$ at the FFT point $f_1$ adjacent to the FFT point $f_0$ and the average value $Y_{AVE}'(f)$ at the FFT point $f_2$ adjacent to the FFT point $f_1$. The IFFT operator 26 calculates the tap coefficient c(t) by using the average value $Y_{AVE}''(f)$ containing the value that is replaced by the replacement unit 202.

Accordingly, it is possible to more authentically estimate the characteristic of the phase error Y(F) of the analog circuit 30 containing the characteristic of the BPF 34 near the frequencies at both ends of the transmission signal band $\Delta f_0$. Accordingly, the estimated phase errors Y(f) are values close to the original phase errors Y(f) of the analog circuit 30 and thus it is possible to accurately correct the phase errors of the analog circuit 30.

[g] Seventh Embodiment

Configuration of Base Station 10

Figure 17:
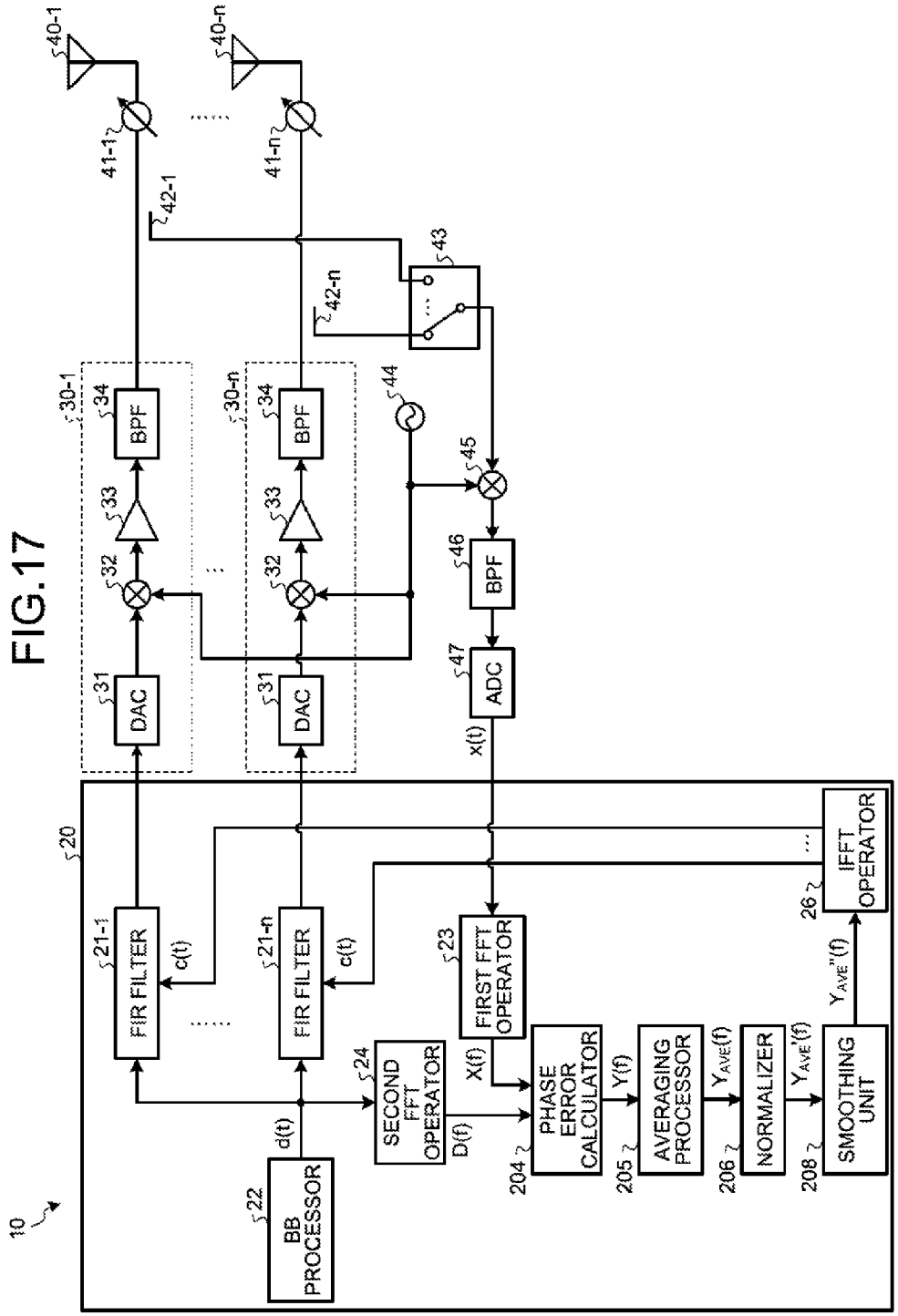
FIG. 17 is a block diagram of an exemplary base station according to a seventh embodiment.

A seventh embodiment is an embodiment of a combination of the fourth embodiment and the fifth embodiment. FIG. 17 is a block diagram of the exemplary base station 10 according to the seventh embodiment. In FIG. 17, as the blocks denoted with the same numerals as those in FIG. 13 other than blocks to be described below have the same or similar functions as those of the blocks illustrated in FIG. 13, descriptions thereof will be omitted below.

The digital processor 20 according to the seventh embodiment includes the FIR filters 21-1 to 21-n, the BB processor 22, the first FFT operator 23, the second FFT operator 24, and the IFFT operator 26. The digital processor 20 according to the seventh embodiment further includes the phase error calculator 204, the averaging processor 205, the normalizer 206, and a smoothing unit 208.

The smoothing unit 208 acquires an average value $Y_{AVE}'(f)$ for each FFT point from the normalizer 206. The smoothing unit 208 then executes the smoothing processing as the smoothing unit 203 according to the fourth embodiment does with respect to each of the FFT points corresponding to the two outermost frequencies in a transmission signal band $\Delta f_0$. Specifically, the smoothing unit 208 adds average values $Y_{AVE}'(f)$ for FFT points such that, the frequency response gently attenuates from the average value $Y_{AVE}'(f)$ at the FFT point corresponding to the outermost frequency in the transmission signal band $\Delta f_0$ to 0 in the area $\Delta f_1$ outside the transmission signal band $\Delta f_0$. The smoothing unit 208 then outputs the average values $Y_{AVE}''(f)$ containing the added average values $Y_{AVE}'(f)$ for the FFT points to the IFFT operator 26. The IFFT operator 26 performs IFFT on the average values $Y_{AVE}''(f)$ that are output from the smoothing unit 208 to calculate tap coefficients c(t) of respective taps of the FIR filter 21.

Procedure of Antenna Calibration

Figure 18:
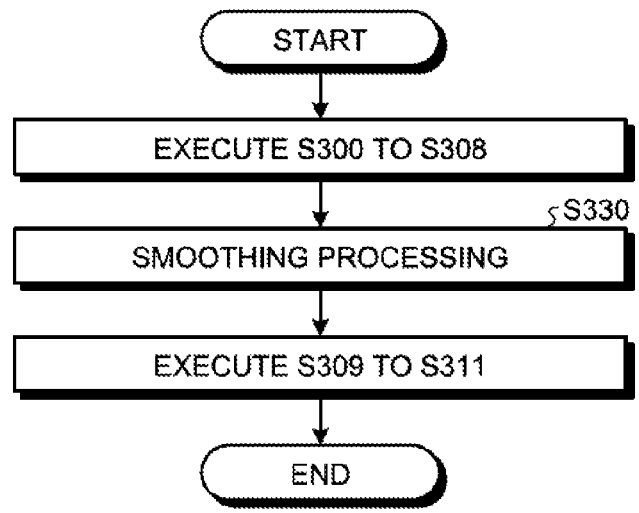
FIG. 18 is a flowchart of exemplary antenna calibration according to the seventh embodiment.

FIG. 18 is a flowchart of exemplary antenna calibration according to the seventh embodiment. The base station 10 executes the process illustrated in FIG. 18 per given timing during operation. FIG. 18 illustrates the process different from that according to the flowchart of antenna calibration illustrated in FIG. 14.

In the antenna calibration according to the seventh embodiment, first of all, as in the antenna calibration illustrated in FIG. 14, the process at steps S300 to S308 is executed. The smoothing unit 208 then acquires an average value $Y_{AVE}'(f)$ for each FFT point from the normalizer 206 and executes the smoothing processing illustrated with reference to FIGS. 10A and 10B (S330). Then, as in the antenna calibration illustrated in FIG. 14, the process at steps S309 to S311 is executed.

Effect of Seventh Embodiment

As it is clear from the above descriptions, the base station 10 according to the seventh embodiment includes the smoothing unit 208. The smoothing unit 208 performs, with respect to each of the analog circuits 30, smoothing such that the average value $Y_{AVE}'(f)$ that is output for each FFT point from the normalizer 206 gently attenuates in the frequency band outside the frequency band of the transmission signal D(f). The IFFT operator 26 calculates tap coefficients c(t) of the FIR filter 21 by using the average values $Y_{AVE}''(f)$ smoothed by the smoothing unit 208. Accordingly, it is possible to reduce the number of taps of the FIR filters 21 and thus reduce the circuit scale of the FIR filter 21.

Hardware

Figure 19:
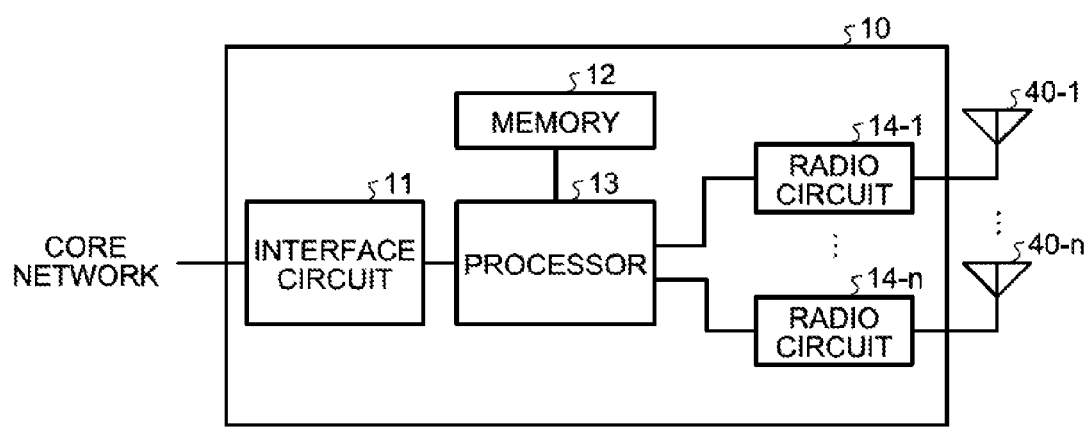
FIG. 19 is a diagram of exemplary hardware of the base station.

The base station 10 according to the first to seventh embodiments is put in use by using, for example, the hardware illustrated in FIGS. 9 and 9B. FIG. 19 is a diagram of exemplary hardware of the base station 10. The base station 10 includes, for example, as illustrated in FIG. 19, an interface circuit 11, a memory 12, a processor 13, a plurality of radio circuits 14-1 to 14-n, and a plurality of antennas 40-1 to 40-n. When the radio circuits 14-1 to 14-n are collectively referred to without being distinguished from one another, they will be simply referred to as the radio circuits 14. When the antennas 40-1 to 40-n are collectively referred to without being distinguished from one another, they will be simply referred to as the antennas 40.

The interface circuit 11 is an interface for performing wired communication with a core network. Each of the radio circuits 14 includes the analog circuit 30. The single radio circuit 14 is provided in association with the single antenna 40. Each of the radio circuits 14 performs processing, such as upconversion, on a signal that is output from the processor 13 and transmits the processed signal via the corresponding antenna 40. Any one of the radio circuits 14 performs processing, such as downconversion, on part of the signal that is output from the analog circuit 30 in each of the radio circuits 14 and sends back the processed signal as a feedback to the processor 13. The radio circuit 14 includes, for example, the analog circuit 30, the phase shifter 41 and the coupler 42. Any one of the radio circuits 14 includes, for example, the selector 43, the oscillator 44, the downconverter 45, the BPF 46, and the ADC 47.

The memory 12 stores various types of programs and data for implementing the function of the digital processor 20. The processor 13 executes, for example, a program that is read from the memory 12 to implement, for example, each function of the digital processor 20. For example, in the first embodiment, the processor 13 executes, for example, the program that is read from the memory 12 to implement the functions of the FIR filter 21, the BB processor 22, the first FFT operator 23, the second FFT operator 24, the phase error calculator 25, and the IFFT operator 26. Furthermore, in the second embodiment, the processor 13 executes, for example, the program that is read from the memory 12 to implement the functions of the FIR filter 21, the BB processor 22, the first FFT operator 23, the second FFT operator 24, the phase error calculator 25, the IFFT operator 26, the power calculator 200, and the averaging processor 201. In the third embodiment, the processor 13 executes, for example, the program that is read from the memory 12 to implement the functions of the FIR filter 21, the BB processor 22, the first FFT operator 23, the second FFT operator 24, the phase error calculator 25, the IFFT operator 26, the power calculator 200, the averaging processor 201, and the replacement unit 202. In the fourth embodiment, the processor 13 executes, for example, the program that is read from the memory 12 to implement the functions of the FIR filter 21, the BB processor 22, the first FFT operator 23, the second FFT operator 24, the phase error calculator 25, the IFFT operator 26, the power calculator 200, the averaging processor 201, and the smoothing unit 203. In the fifth embodiment, the processor 13 executes, for example, the program that is read from the memory 12 to implement the functions of the FIR filter 21, the BB processor 22, the first FFT operator 23, the second FFT operator 24, the IFFT operator 26, the phase error calculator 204, the averaging processor 205, and the normalizer 206. In the sixth embodiment, the processor 13 executes, for example, the program that is read from the memory 12 to implement the functions of the FIR filter 21, the BB processor 22, the first FFT operator 23, the second FFT operator 24, the IFFT operator 26, the phase error calculator 204, the averaging processor 205, the normalizer 206, and the replacement unit 207. In the seventh embodiment, the processor 13 executes, for example, the program that is read from the memory 12 to implement the functions of the FIR filter 21, the BB processor 22, the first FFT operator 23, the second FFT operator 24, the IFFT operator 26, the phase error calculator 204, the averaging processor 205, the normalizer 206, and the smoothing unit 208.

All the program and data in the memory 12 are not necessarily stored in the memory 12 from the beginning. For example, the program and data may be stored in a portable recording medium, such as a memory card, that is inserted into the base station 10 and the base station 10 may properly acquire and executes the program and data from the portable recording medium. Alternatively, the base station 10 may properly acquire and executes the program and data from another computer or a server device in which the program and data are stored via, for example, a wireless communication line, the public line, the Internet, a LAN or a WAN.

The disclosed technology is not limited to the above-described embodiments. Various modifications may be made within the scope of the summary.

For example, the above-described embodiments may be combined as appropriate within a range where no discrepancy from the process content is caused. For example, the third embodiment where the replacement processing is performed and the fourth embodiment where the smoothing processing is performed may be combined. Similarly, the sixth embodiment where the replacement processing is performed and the seventh embodiment where the smoothing processing is performed may be combined.

According to the first embodiment, it is possible to accurately correct phase errors among antennas.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising a plurality of antennas and a plurality of analog circuits that are provided for the antennas, respectively, the base station comprising:
   a first converter that converts, with respect to each of the analog circuits, a signal in a time domain that is obtained after a given signal passes through the analog circuit into a first signal in a frequency domain;
   a second converter that converts the signal in the time domain into a second signal in the frequency domain;
   a first calculator that calculates, with respect to each of the analog circuits, an inverse characteristic of a phase characteristic in the frequency domain based on the first signal and the second signal;
   a second calculator that calculates, with respect to each of the analog circuits, a tap coefficient of a filter based on the inverse characteristic of the phase characteristic; and
   a finite impulse response (FIR) filter that filters, with respect to each of the analog circuits, the given signal that is input to the analog circuit based on the tap coefficient that is calculated by the second calculator.

2. The base station according to claim 1, wherein
   the first calculator calculates, for each of given frequencies, the inverse characteristic of the phase characteristic by multiplying the second signal by the reciprocal of the first signal,
   the base station includes an output unit that, with respect to each of the analog circuits, determines whether the second signal exists for each of the given frequencies, calculates an average value by using the inverse characteristic of the phase characteristic, which is calculated by the first calculator, for the given frequency for which it is determined that the second signal exists, calculates the average value that is calculated for the last time as the current average value for the given frequency for which it is determined that the second signal does not exist, and outputs the calculated average value to the second calculator; and the second calculator calculates the tap coefficient by using the average value that is output from the output unit for each of the given frequencies.

3. The base station according to claim 2, further comprising a replacement unit that replaces, with respect to each of the analog circuits, the average value for a first frequency that is the given frequency in the outermost position in a frequency band of the given signal among the average values that are output from the output unit for the respective given frequencies with a value on a straight line passing though the average value for a second frequency adjacent to the first frequency in the frequency band and the average value for a third frequency adjacent to the second frequency, wherein the second calculator calculates the tap coefficient by using the average value containing the value that is replaced by the replacement unit.

4. The base station according to claim 2, further comprising a smoothing unit that performs, with respect to each of the analog circuits, smoothing such that the average value that is output from the output unit gently attenuates in a frequency band outside the frequency band of the given signal, wherein the second calculator calculates the tap coefficient by using the average value on which the smoothing is performed by the smoothing unit.

5. The base station according to claim 1, wherein the first calculator calculates, for each of the given frequencies, the inverse characteristic of the phase characteristic by multiplying the second signal by a complex conjugate of the first signal, the base station includes a normalizer that normalizes the average value of the inverse characteristic of the phase characteristic that is calculated by the first calculator, and the second calculator calculates, for each of the given frequencies, the tap coefficient by using the average value that is normalized by the normalizer.

6. The base station according to claim 5, further comprising a replacement unit that, with respect to each of the analog circuits, replaces the average value for a first frequency that is the given frequency in the outermost position in the frequency band among the average values that are normalized by the normalizer for the respective given frequencies with a value on a straight line passing though the average value for a second frequency adjacent to the first frequency in the frequency band and the average value for a third frequency adjacent to the second frequency, wherein the second calculator calculates the tap coefficient by using the average value containing the value that is replaced by the replacement unit.

7. The base station according to claim 5, further comprising a smoothing unit that performs, with respect to each of the analog circuits, smoothing such that the average value that is normalized by the normalizer gently attenuates in a frequency band outside the frequency band of the given signal, wherein the second calculator calculates the tap coefficient by using the average value on which the smoothing is performed by the smoothing unit.

8. A calibration method in a base station including a plurality of antennas and a plurality of analog circuits that are provided for the antennas, respectively, the calibration method comprising:

converting, with respect to each of the analog circuits, a signal in a time domain that is obtained after a given signal passes through the analog circuit into a first signal in a frequency domain;

converting the signal in the time domain into a second signal in the frequency domain;

calculating, with respect to each of the analog circuits, an inverse characteristic of a phase characteristic in the frequency domain based on the first signal and the second signal;

calculating, with respect to each of the analog circuits, a tap coefficient based on the inverse characteristic of the phase characteristic; and filtering, with respect to each of the analog circuits, the given signal that is input to the analog circuit based on the calculated tap coefficient.

* * * * *